(12) United States Patent
Miyazaki

(10) Patent No.: US 10,782,869 B2
(45) Date of Patent: Sep. 22, 2020

(54) INFORMATION PROCESSING DEVICE, INFORMATION PROCESSING METHOD, AND INFORMATION PROCESSING PROGRAM FOR SELECTIVELY CHANGING A VALUE OR A CHANGE SPEED OF THE VALUE BY A USER OPERATION

(71) Applicant: LINE Corporation, Shinjuku-ku, Tokyo (JP)

(72) Inventor: Reiko Miyazaki, Tokyo (JP)

(73) Assignee: LINE CORPORATION, Tokyo (JP)

( * ) Notice: Subject to any disclaimer, the term of this patent is extended or adjusted under 35 U.S.C. 154(b) by 57 days.

(21) Appl. No.: 15/655,315

(22) Filed: Jul. 20, 2017

(65) Prior Publication Data

US 2017/0315690 A1    Nov. 2, 2017

Related U.S. Application Data

(63) Continuation of application No. 13/179,626, filed on Jul. 11, 2011, now Pat. No. 9,747,016.

(30) Foreign Application Priority Data

Jul. 30, 2010    (JP) .................................. 2010-172894

(51) Int. Cl.
G06F 3/033        (2013.01)
G06F 3/0485        (2013.01)
G06F 3/0484        (2013.01)
G06F 3/0488        (2013.01)

(52) U.S. Cl.
CPC ........ *G06F 3/0485* (2013.01); *G06F 3/04847* (2013.01); *G06F 3/04883* (2013.01); *G06F 2203/04806* (2013.01)

(58) Field of Classification Search
CPC .............. G06F 3/0485; G06F 3/04847; G06F 3/04883; G06F 2203/04806
See application file for complete search history.

(56) References Cited

U.S. PATENT DOCUMENTS

| | | | |
|---|---|---|---|
| 6,618,063 B1 * | 9/2003 | Kurtenbach | G06F 3/0482 715/810 |
| 6,677,965 B1 * | 1/2004 | Ullmann | G06F 3/04812 715/786 |
| 8,040,319 B2 | 10/2011 | Heynen et al. | |
| 2004/0027460 A1 | 2/2004 | Morita | |
| 2007/0192744 A1 * | 8/2007 | Reponen | G06F 3/0236 715/833 |

(Continued)

FOREIGN PATENT DOCUMENTS

| | | | |
|---|---|---|---|
| JP | 2002-328040 A | | 11/2002 |
| JP | 2009240620 A | * | 10/2009 |

*Primary Examiner* — Kieu D Vu
*Assistant Examiner* — Asteway T Gattew
(74) *Attorney, Agent, or Firm* — Harness, Dickey & Pierce, P.L.C.

(57) ABSTRACT

An information processing device includes an operating unit, and a control unit for switching, when dragging is performed which is an operation to change a predetermined value via the operating unit, between changing the value by an amount equivalent to the amount of dragging, and setting a change speed of the value according to the dragging and continue to change the value at the change speed, according to the position of an ending point as to a starting point of the dragging.

18 Claims, 25 Drawing Sheets

ZOOMING SCALE IS INCREASED/DECREASED BY THE AMOUNT OF DRAGGING

(56) References Cited

U.S. PATENT DOCUMENTS

| | | | |
|---|---|---|---|
| 2007/0273666 A1* | 11/2007 | Shin | G06F 3/04883 345/173 |
| 2007/0273668 A1 | 11/2007 | Park et al. | |
| 2008/0084400 A1 | 4/2008 | Rosenberg | |
| 2008/0168365 A1 | 7/2008 | Chaudhri | |
| 2008/0189613 A1 | 8/2008 | Jong et al. | |
| 2008/0297483 A1* | 12/2008 | Kim | G06F 3/04817 345/173 |
| 2009/0237371 A1* | 9/2009 | Kim | G06F 3/0485 345/173 |
| 2009/0251410 A1* | 10/2009 | Mori | G06F 3/04812 345/157 |
| 2009/0284532 A1* | 11/2009 | Kerr | G06F 3/0481 345/442 |
| 2010/0005390 A1 | 1/2010 | Bong | |
| 2010/0134425 A1 | 6/2010 | Storrusten | |
| 2010/0156833 A1 | 6/2010 | Kim et al. | |
| 2010/0269040 A1* | 10/2010 | Lee | G06F 3/04817 715/702 |
| 2010/0275150 A1* | 10/2010 | Chiba | G06F 3/0488 715/784 |
| 2010/0289825 A1* | 11/2010 | Shin | G06F 3/04845 345/667 |
| 2010/0299638 A1 | 11/2010 | Choi | |
| 2010/0315438 A1 | 12/2010 | Horodezky et al. | |
| 2011/0025627 A1 | 2/2011 | Sakai | |
| 2011/0115711 A1* | 5/2011 | Gunawan | G06F 1/1626 345/169 |
| 2011/0154196 A1* | 6/2011 | Icho | G06F 3/0485 715/702 |

* cited by examiner

FIG. 6
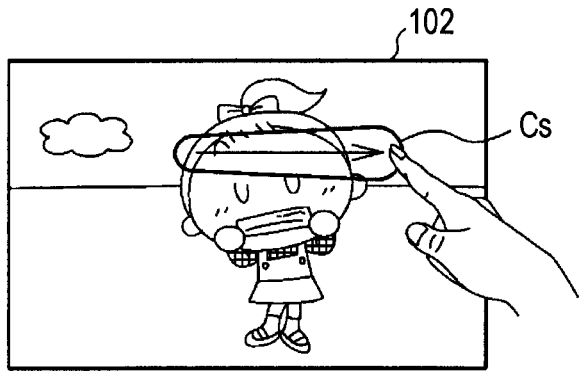
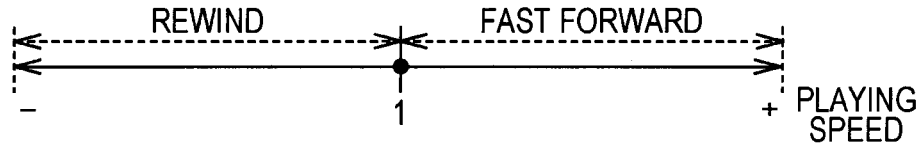
FIG. 7A
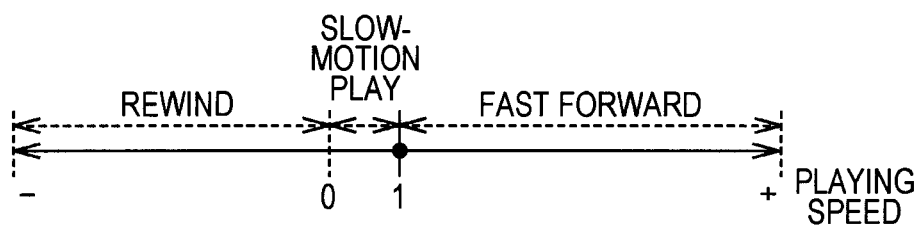
FIG. 7B
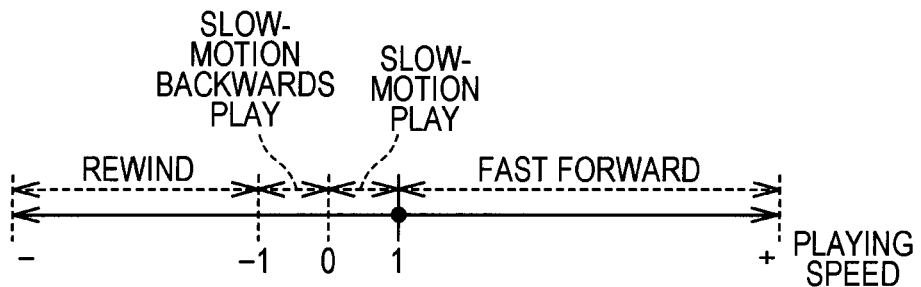
FIG. 7C

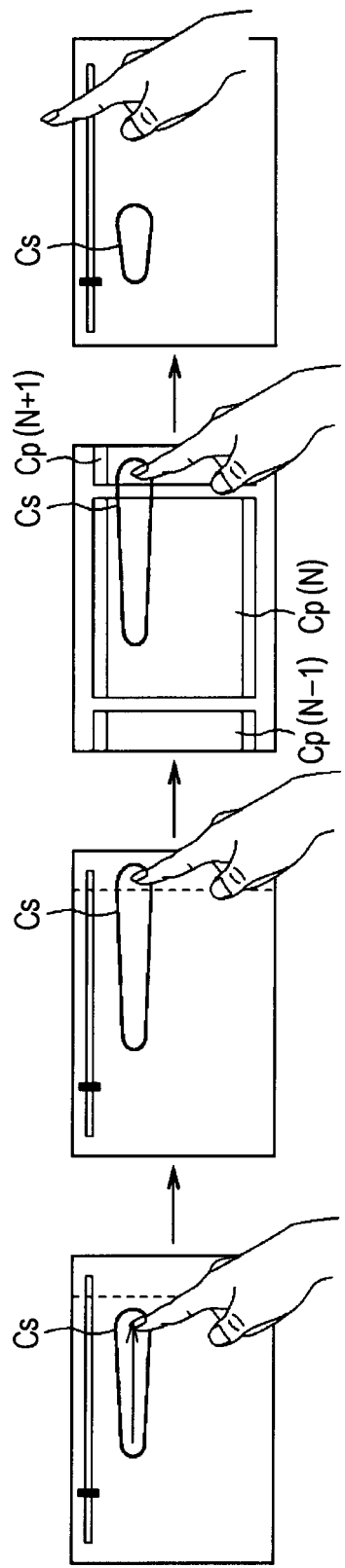

ADJUST PARAMETER (VOLUME)

( CONTROL VALUES OF ADJUSTMENT DIRECTION AND
ADJUSTMENT SPEED OF VOLUME ACCORDING TO
DIRECTION AND LENGTH OF MOCHI CURSOR )

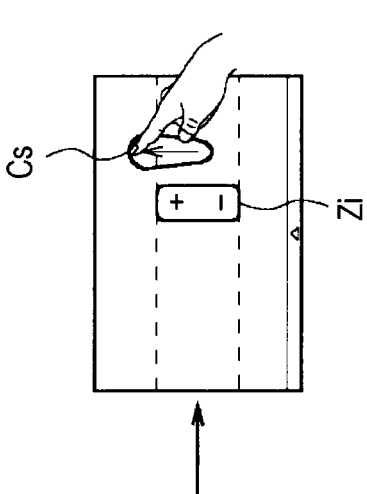
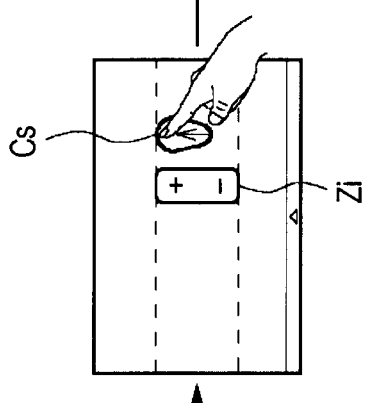
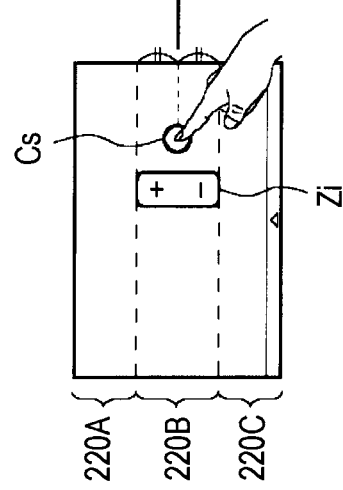

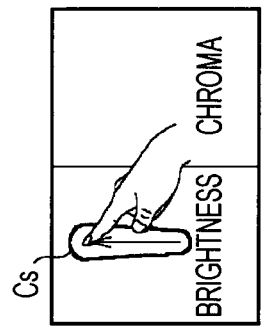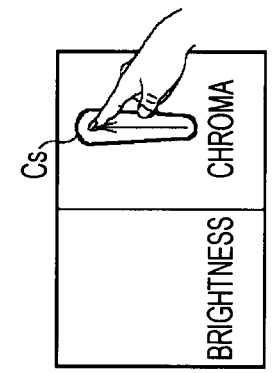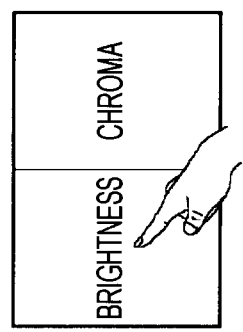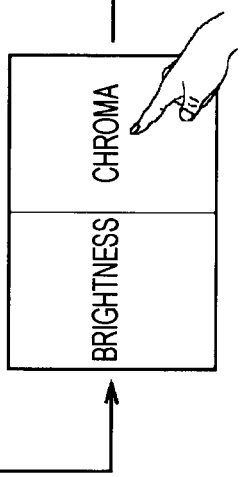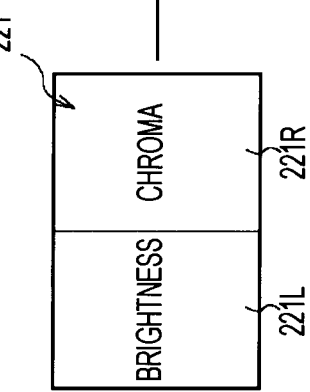

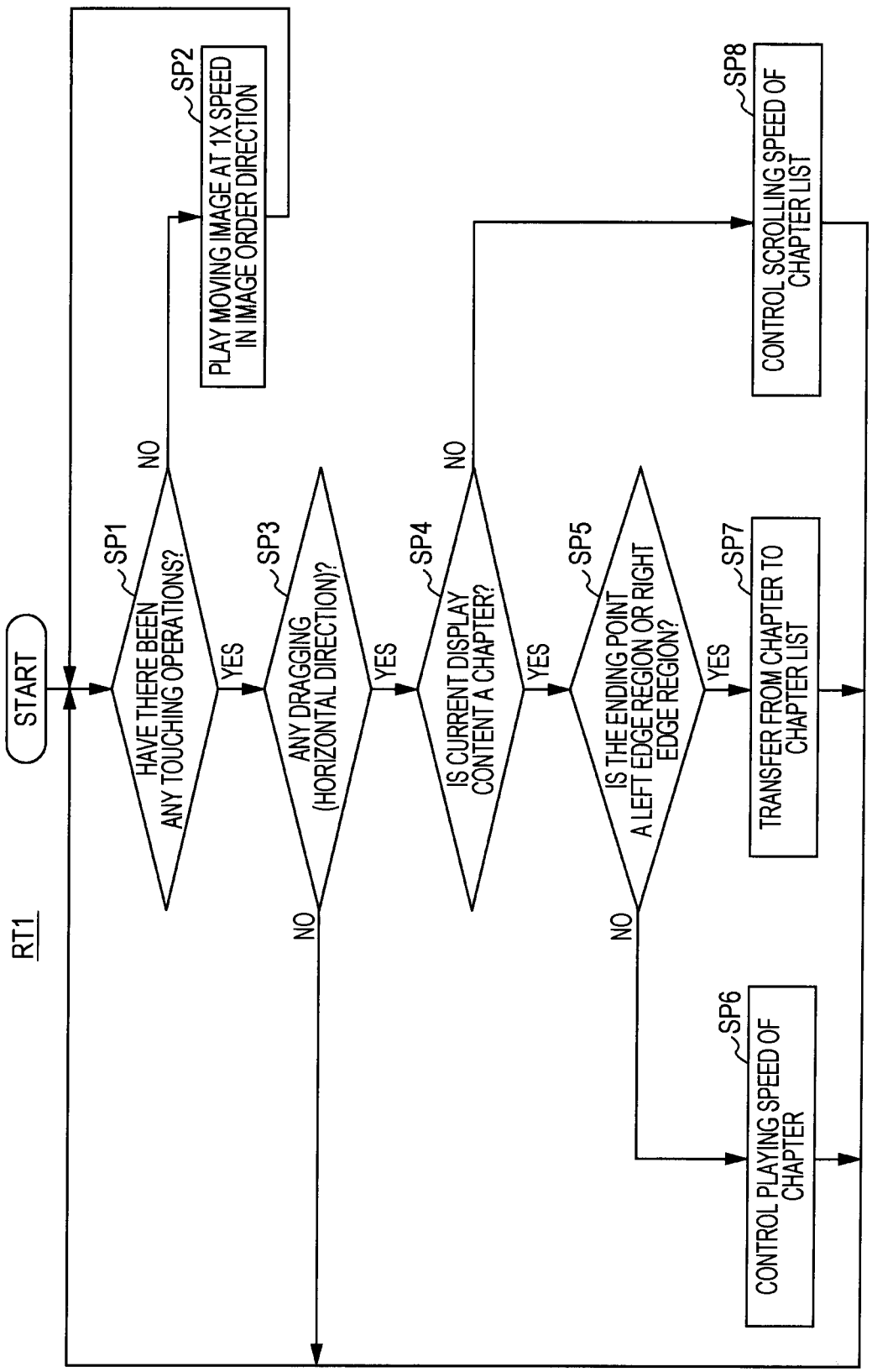

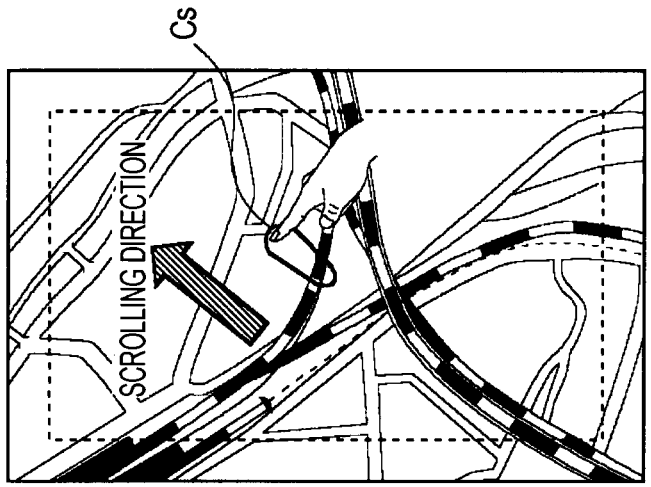
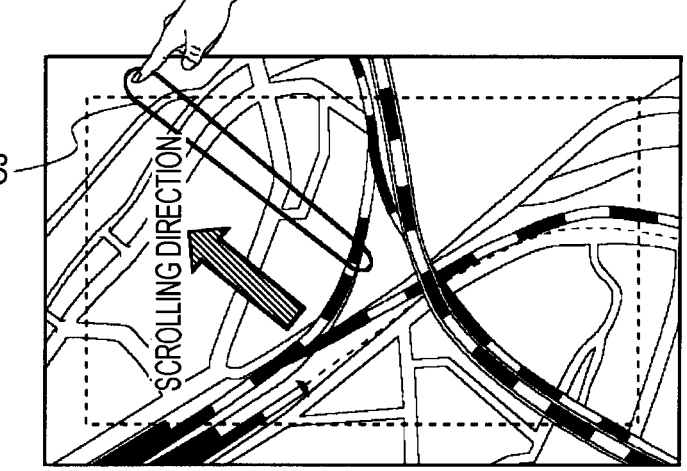
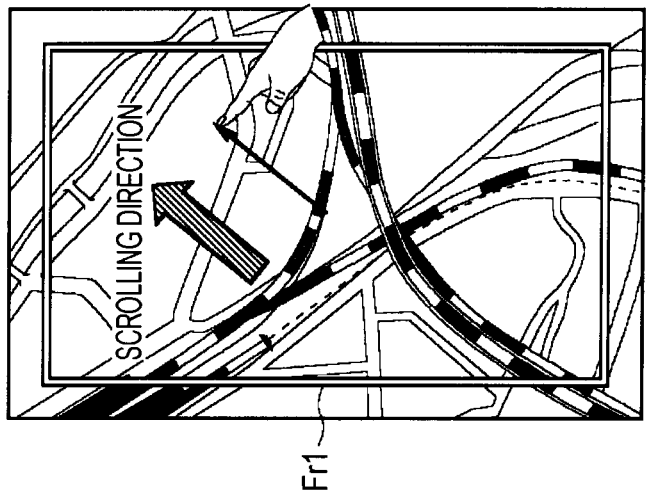

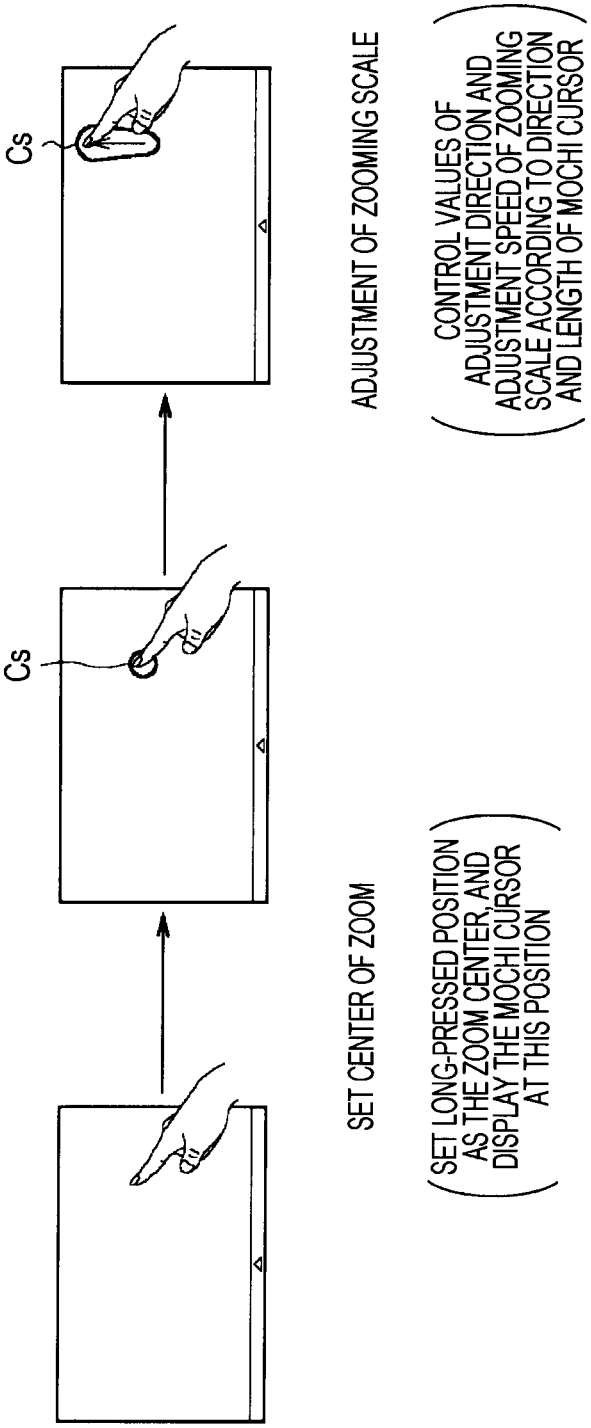

SET CENTER OF ZOOM ( SET TAPPED POSITION AS THE ZOOM CENTER, AND DISPLAY THE MOCHI CURSOR AT THIS POSITION )

ADJUSTMENT OF ZOOMING SCALE ( CONTROL VALUES OF ADJUSTMENT DIRECTION AND ADJUSTMENT SPEED OF ZOOMING SCALE ACCORDING TO DIRECTION AND LENGTH OF MOCHI CURSOR )

INFORMATION PROCESSING DEVICE, INFORMATION PROCESSING METHOD, AND INFORMATION PROCESSING PROGRAM FOR SELECTIVELY CHANGING A VALUE OR A CHANGE SPEED OF THE VALUE BY A USER OPERATION

CROSS-REFERENCE TO RELATED APPLICATIONS

This Application is a Continuation of application Ser. No. 13/179,626 filed on Jul. 11, 2011. Application Ser. No. 13/179,626 claims priority to Application 2010-172894 filed on Jul. 30, 2010 in Japan. The entire contents of each of these applications are incorporated herein by reference in their entirety.

BACKGROUND

The present disclosure relates to an information processing device, information processing method and information processing program, favorably applicable to an information processing device where operation input by dragging which is an intuitive operation can be performed, for example.

Recently, information processing devices which have various types of operation devices have been widely used. For example, of information processing devices having a touch screen, intuitive operations are possible by touch operations (touching) as to the screen, tapping (touching and releasing), dragging (tracing), flicking, and so forth.

As this sort of information processing device, for example, a navigation device has been proposed wherein the scale of a map displayed on the screen is changed by dragging the screen (see Japanese Unexamined Patent Application Publication No. 2002-328040, for example.)

Also, information processing devices wherein an image displayed on the screen is enlarged/reduced (zoom-in/zoom-out) by dragging the screen are in widespread use, and are not limited to this navigation device.

SUMMARY

Now, with an information processing device such as described above, the zooming scale can be made larger or smaller according to the amount of dragging, so the zooming scale can be readily adjusted.

Conversely, the range wherein adjustments can be made is restricted to dragging one time, whereby, for example, in the case that even if dragged from one edge of the screen to the other edge, the desired zooming scale is not achieved, dragging should be repeated until the desired zooming scale is achieved.

Now, if the change amount of the zooming scale as to the dragging is made to be large, the range wherein adjustment can be made by dragging one time increases. However, by doing so, the zooming scale changes all at once, whereby adjusting to a desired zooming rate becomes difficult, resulting in having to repeat the dragging. Thus, with an information processing device according to the related art, dragging has to be repeated several times depending on the situation, so there is room for improvement in operability.

It has been found desirable to propose an information processing device, information processing method and information processing program wherein operability of operations regarding input by dragging is further improved as compared to devices according to the related art.

According to an embodiment of the present disclosure, an operating unit, and a control unit which, upon dragging having been performed which is an operation to change predetermined values via the operating unit, switches, according to the position of the dragging ending point as to the starting point, between whether to change the value by an amount equivalent to the amount of dragging, or whether to set the change speed of the value according to the dragging and continue to change the value at this change speed.

Now, if the value is changed by an amount equivalent to the amount of dragging, the value can be readily adjusted. Also on the other hand, if the change speed of the value is set according to the dragging and the value continues to change, the value can be adjusted without limiting the adjustment range of the value to dragging one time.

Also, by causing to switch according to the position of the dragging ending point as to the starting point, between whether to change the value by an amount equivalent to the amount of dragging, or whether to set the change speed of the value according to the dragging and continue to change the value at this change speed, for example, when the dragging end point is within a predetermined range from the starting point, the value can be changed by an amount equivalent to the amount of dragging, and when the end point is outside this range, the change speed of the value can be set according to the dragging and the value continuously changed.

Thus, the value can be readily adjusted by dragging one time, without limiting the adjustment range of the value. That is to say, the value can be readily adjusted to a desired value without performing dragging multiple times.

BRIEF DESCRIPTION OF THE DRAWINGS

FIG. 6 is a schematic diagram to accompany a description of first control of playing speed;

FIGS. 7A through 7C are schematic diagrams to accompany a description of second control of playing speed;

FIGS. 13A through 13D are schematic diagrams to accompany a description of a first operation input example by a mochi cursor with a moving picture application;

FIGS. 18A through 18C are schematic diagrams to accompany a description of a first operation input example by a mochi cursor with a still image playing application;

FIGS. 19A through 19E are schematic diagrams to accompany a description of a second operation input example by a mochi cursor with a still image playing application;

FIG. 20 is a flowchart describing first operation input processing procedures;

FIGS. 26A through 26C are schematic diagrams to accompany a description of an operation input example by a mochi cursor with a map display application;

FIGS. 27A through 27C are schematic diagrams to accompany a description of a first operation input example by a mochi cursor with a still image playing application according to another embodiment;

DETAILED DESCRIPTION OF EMBODIMENTS

Preferred embodiments for carrying out the disclosure (hereafter called embodiments) will be described below. Note that the description will be given in the following order.
1. Overview of Embodiments
2. First Embodiment
3. Second Embodiment
4. Other Embodiments 1. Overview of Embodiments First, an overview of the embodiments will be described. Note that after describing this overview, the description will move to the first embodiment, second embodiment, and other embodiments.

Figure 1:
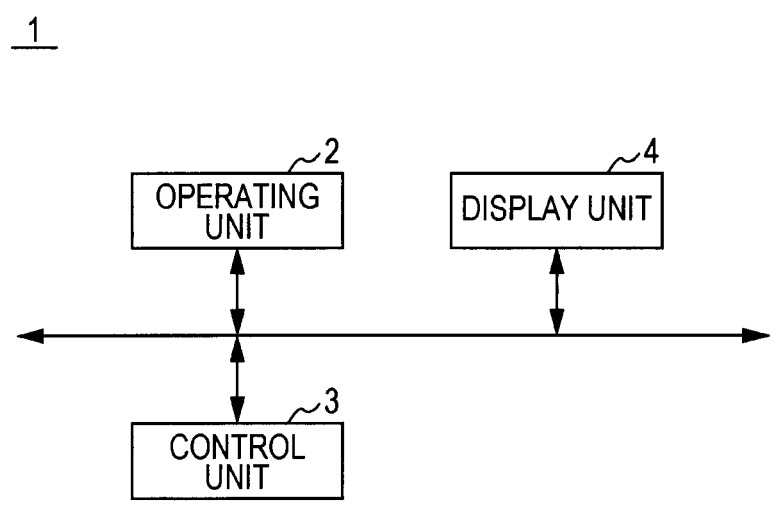
FIG. 1 is a block diagram illustrating a functional configuration of an information processing device which is an overview of an embodiment.

In FIG. 1, 1 denotes an information processing device. An operating unit 2 is provided to this information processing device 1. Also, a control unit 3, which, upon dragging having been performed which is an operation to change predetermined values via the operating unit 2, switches, according to the position of the dragging ending point as to the starting point, between whether to change the value by an amount equivalent to the amount of dragging, or whether to set the change speed of the value according to the dragging and continue to change the value at this change speed, is provided to this information processing device 1.

By doing so, if the value is changed by an amount equivalent to the amount of dragging, the value can be readily adjusted. Also on the other hand, if the change speed of the value is set according to the dragging and the value is continued to change, the value can be adjusted without limiting the adjustment range of the value to dragging one time.

Also, by causing to switch according to the position of the dragging ending point as to the starting point, between whether to change the value by an amount equivalent to the amount of dragging, or whether to set the change speed of the value according to the dragging and continue to change the value at this change speed, for example, when the dragging end point is within a predetermined range from the starting point, the value can be changed by an amount equivalent to the amount of dragging, and when the end point is outside this range, the change speed of the value can be set according to the dragging and the value continuously changed.

Thus, the value can be readily adjusted by dragging one time, without limiting the adjustment range of the value. That is to say, the value can be readily adjusted to a desired value without performing dragging multiple times.

Note that switching may be performed wherein, when the dragging ending point is within a predetermined range from the starting point, the control unit 3 changes the value by an amount equivalent to the amount of dragging, and when the dragging ending point is outside the predetermined range, sets the change speed of the value according to the dragging and the continues to change the value at the change speed herein.

Specifically, upon dragging, which is an operation to increase/decrease a predetermined parameter, having been performed, when the dragging ending point is within a predetermined range from the starting point the control unit 3 increases/decreases the parameter by an amount equivalent to the amount of dragging. On the other hand, switching may be performed so that when the dragging ending point is outside the predetermined range, the increase/decrease speed of the parameter is set according to the dragging and parameter is continuously increased/decreased at the increase/decrease speed herein.

Also, upon dragging, which is an operation to move the playing position of the content by dragging, having been performed, when the dragging ending point is within a predetermined range from the starting point the control unit 3 moves the playing position by the amount of dragging. On the other hand, switching may be performed so that when the dragging ending point is outside the predetermined range, the moving speed of the playing position is set according to the dragging and the playing position is continuously moved at the moving speed herein.

Further, upon dragging, which is an operation to move the display position of a display item that is displayed on the display unit 4 by dragging, having been performed, when the dragging ending point is within a predetermined range from the starting point the control unit 3 moves the display position by an amount equivalent to the amount of dragging. On the other hand, switching may be performed so that when the dragging ending point is outside the predetermined range, the moving speed of the display position is set according to the dragging and the display position is continuously moved at the moving speed herein.

Also, the control unit 3 may display a cursor that ties together the dragging starting point and ending point according to the dragging on the display unit 4. In this case, the control unit 3 may display information indicating the predetermined range near the cursor on the display unit 4.

Also, in this case, in the event that the control unit 3 sets the change speed of the value according to the dragging, the direction from one edge portion of a cursor serving as the dragging starting point side to the other edge portion of the cursor serving as the dragging ending point side can be the direction of the cursor, and the change speed of the value can also be set according to the direction and length of the cursor.

Also when the control unit 3, upon changing the value by an amount equivalent to the amount of dragging, has switched so as to set the change speed of the value according to dragging so as to continuously change the value by the change speed, the value may be continuously changed at the change speed from the value immediately preceding the switching. Also when the control unit 3, upon setting the change speed of the value according to the dragging and continuously changing the value with the change speed, has switched so as to change the value by an amount equivalent to the amount of dragging, the value may be changed by an amount equivalent to the amount of dragging from the value immediately preceding the switching.

A specific example of the information processing device 1 made of such a configuration will be described in detail below.

2. First Embodiment

2-1. External Configuration of Portable Terminal

Figure 2:
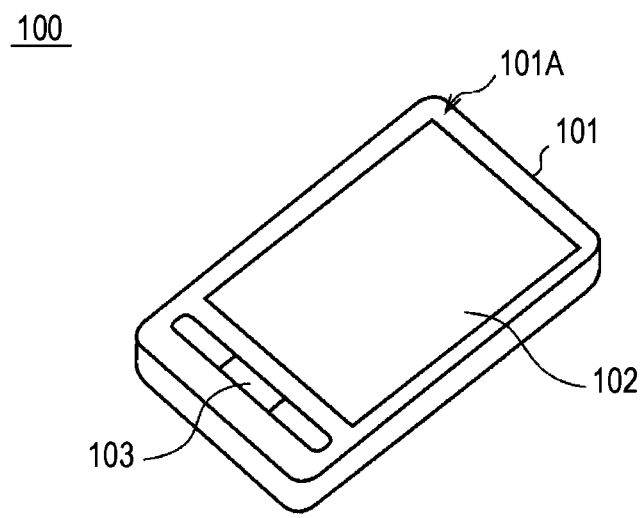
FIG. 2 is a schematic diagram illustrating an external view configuration of a portable terminal.

Next, a specific example of a first embodiment will be described. First, an external configuration of a portable terminal 100 which is a specific example of the information processing device 1 described above will be described with reference to FIG. 2.

The portable terminal 100 has a housing 101 in a roughly flattened rectangle shape of a size that can be gripped in one hand.

In the center of a front face 101A of the housing 101, a rectangular touch screen 102 is provided. The touch screen 102 is made up of a liquid crystal panel and a thin transparent touch panel that covers the display face of the liquid crystal panel. Note that this touch panel is a capacitance type touch panel, for example.

The portable terminal 100 can accept a touch operation with a finger (a touch pen or the like is also acceptable) as operation input by a user as to the touch screen 102.

Further, an operating button 103 is also provided near the touch screen 102 on the front face 101A of the housing 101 of the portable terminal 100.

Note that the portable terminal 100 can be used whether the rectangular touch screen 102 is faced vertically (this is called vertical-facing) or faced horizontally (this is called horizontal-facing).

2-2. Hardware Configuration of Portable Terminal

Figure 3:
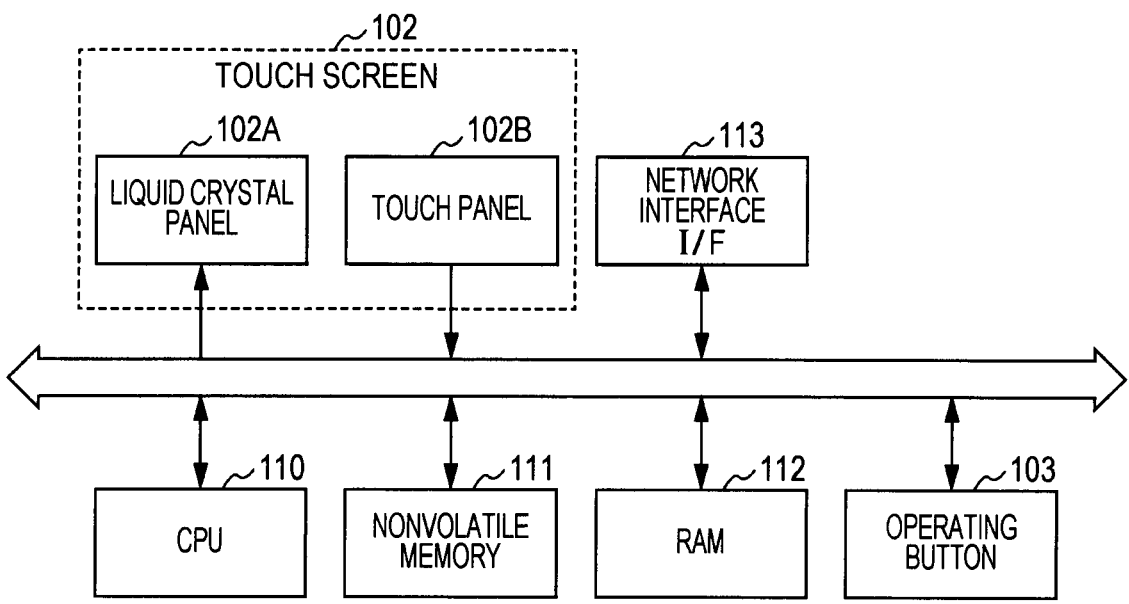
FIG. 3 is a block diagram illustrating a hardware configuration of a portable terminal.

Next, the hardware configuration of the portable terminal 100 will be described with reference to FIG. 3. According to the portable terminal 100, a CPU 110 loads to a RAM 112 and reads in a program stored in a nonvolatile memory 111, executes various processing according to the program, and controls various parts. Note that the CPU is an abbreviation of Central Processing Unit, and RAM is an abbreviation of Random Access Memory.

The touch screen 102 is made up of a liquid crystal panel 102A which is a display device to display various information and a touch panel 102B which is an operation input device to accept operation input.

Upon any position on the touch panel 102B having been touched by a finger, the touch panel 102B detects the coordinates of the position touched (i.e. the touch position). The touch panel 102B transmits an input signal indicating the coordinates of the touch position to the CPU 110.

Note that while the touch panel 102B is continuously touched, such as during dragging, the touch panel 102B transmits an input signal indicating the coordinates of the touch position to the CPU 110 every fixed amount of time.

Upon obtaining the coordinates of the touch position from the input signal transmitted from the touch panel 102B, the CPU 110 exchanges these coordinates for screen coordinates on the liquid crystal panel 102A, thereby confirming which position on the screen of the liquid crystal panel 102A has been touched. That is to say, the touch position on the screen is confirmed.

Also, by exchanging the coordinates of the touch position obtained by the input signals transmitted every fixed amount of time with screen coordinates of the liquid crystal panel 102A sequentially, the CPU 110 confirms how the touch position has moved (i.e. the path of the touch position).

Based on the touch positions and the path thereof thus confirmed, the CPU 110 identifies how the touch operations have been performed as to the screen, accepts the touch operations as operation input, and executes the touch operations as operation input.

Note that the CPU 110 can accept touch operations of touching, tapping (touching and releasing), dragging (tracing), flicking, and so forth, as operation input.

Upon confirming a pressing operation as to an operating button 103, the CPU 110 accepts this as an operation input by a user, and can execute processing according to the operation input.

Now, for example, let us say that in a state wherein a list of image thumbnails stored as image files in the nonvolatile memory 111 are displayed on the touch screen 102, the user taps a desired thumbnail.

The CPU 110 accepts the touch operation as operation input to play an image, and reads out the image file corresponding to the tapped thumbnail from the nonvolatile memory 111.

Now, in the case that the corresponding image file is a still image file, the CPU 110 extracts still image data from the still image file. The CPU 110 then performs predetermined playing processing as to the still image data such as decoding processing, digital-analog conversion processing and the like, thereby obtaining a still image signal, and displays this on the liquid crystal panel 102A of the touch screen 102.

On the other hand, in the case that the corresponding image file is a moving picture file, the CPU 110 separates the moving picture data and audio data from the moving picture file. The CPU 110 then performs predetermined playing processing as to the moving picture data such as decoding processing, digital-analog conversion processing and the like, thereby obtaining a moving picture signal, and displays this on the liquid crystal panel 102A of the touch screen 102. Also, the CPU 110 performs predetermined playing processing such as decoding processing, digital-analog conversion processing, amplification processing and the like as to the audio data, thereby obtaining an audio signal, and outputs this from a headphone terminal (unshown).

Thus, the portable terminal 100 plays images specified by the user.

Also, for example, let us say that in a state wherein the titles of tunes (tracks) stored as tune files in the nonvolatile memory 111 are displayed as a list on the touch screen 102, the user has tapped a desired title.

The CPU 110 accepts the touch operation as operation input to play the tune, and reads out the tune file corresponding to the tapped title from the nonvolatile memory 111.

The CPU 110 extracts audio data from the tune file. The CPU 110 then performs predetermined playing processing such as decoding processing, digital-analog conversion processing, amplification processing and the like as to the audio data, thereby obtaining an audio signal, and outputs this from a headphone terminal (unshown).

Thus, the portable terminal 100 plays the tune specified by the user.

Also at this time the CPU 110 extracts related information such as a jacket image, track title, album title, artist name and the like from the read out tune file, and displays this on the liquid crystal panel 102A of the touch screen 102. Thus, the portable terminal 100 plays the tune specified by the user, while displaying information relating to the tune.

Note that the portable terminal 100 is arranged such that the CPU 110 can manage the tune files in a hierarchical configuration whereby an upper level is the album titles and the lower level is the track titles, based on the related information for each tune file.

Further, for example, let us say that in a state wherein icons corresponding to a Web browser startup are displayed on the touch screen 102, the user has tapped an icon. The CPU 110 accepts the touch operation as an operation input to start the Web browser, reads out and executes the Web browser program from the nonvolatile memory 111, and starts the Web browser.

The CPU 110 displays the Web browser screen on the liquid crystal panel 102A of the touch screen 102, while receiving page data of a Web page from a server on a network, via a network interface 113. The CPU 110 then displays the page image based on the page data on the Web browser screen. Thus, the portable terminal 100 starts the Web browser and displays the Web page.

Additionally a user interface is implemented in the portable terminal 100, which can perform various operation inputs only by dragging which is one type of touch operations.

Specifically, with the portable terminal 100, information such as the positions of the dragging starting point and ending point, the direction from the starting point to the ending point, and the distance from the starting point to the ending point and so forth (hereafter these may also be called dragging information) and the various types of operation input are correlated beforehand.

Note that the dragging starting point is the touch position at the time of starting to drag (i.e. the first touch position), and the dragging ending point is the current touch position after the dragging has started. That is to say, while dragging, the starting point is fixed and the ending point moves according to the movement of the finger. Also, hereafter, the position of the dragging starting point and ending point may be called the starting point-ending point position, the direction from the dragging starting point to the ending point may be called the starting point-ending point direction, and the distance from the dragging starting point to the ending point may be called the starting point-ending point distance.

Upon dragging having been performed, the CPU 110 obtains dragging information such as from the dragging, the starting point-ending point position, starting point-ending point direction, and starting point-ending point distance, from the dragging thereof, and accepts operation input correlated with this dragging information.

Thus, the portable terminal 100 can perform various operation inputs even with only dragging, by changing the starting point-ending point position, starting point-ending point direction, and starting point-ending point distance and so forth.

Now, in order to obtain favorable operability with such a user interface, it is desirable for the user to be able to readily confirm the starting point-ending point position, starting point-ending point direction, and starting point-ending point distance of the dragging.

Figure 4:
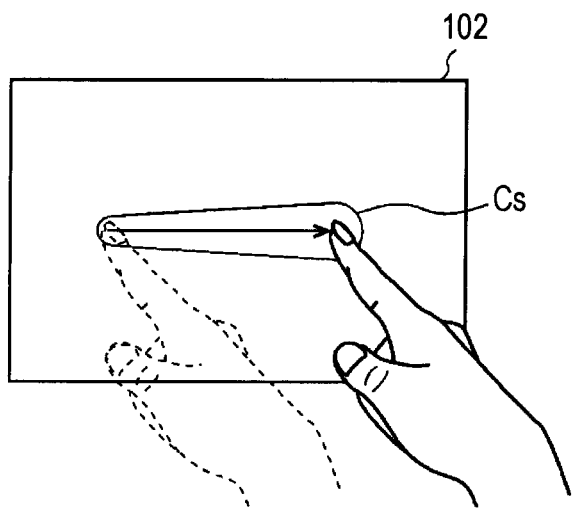
FIG. 4 is a schematic diagram to accompany a description of a display of a mochi cursor.

Thus, as shown in FIG. 4, when dragging is performed, the portable terminal 100 shows a cursor Cs that visually expresses the starting point-ending point position, starting point-ending point direction, and starting point-ending point distance on the touch screen 102.

The cursor Cs stretches from the dragging starting point to the ending point stretching like mochi (Japanese sticky rice cake) or taffy, and following the dragging according to the movement of the dragging ending point by changing the direction (stretching direction) and length thereof. Note that since this cursor Cs stretches and shrinks like mochi according to the dragging, hereafter this will be called a "mochi cursor" Cs.

By displaying the mochi cursor Cs, the portable terminal 100 can enable the user to readily confirm the dragging starting point-ending point position, starting point-ending point direction, and starting point-ending point distance. The mochi cursor Cs and the operation input by the mochi cursor Cs will be described in further detail below.

Note that the specific hardware example of the operating unit 2 of the information processing device 1 described in the overview of embodiments is the touch panel 102B of the portable terminal 100. Also, the specific hardware example of the control unit 3 of the information processing device 1 is the CPU 110 of the portable terminal 100. Further, the specific hardware example of the display unit 4 of the information processing device 1 is the liquid crystal panel 102A of the portable terminal 100.

2-3. Operation Input by Mochi Cursor 2-3-1. Basic Operation

Figure 5A:
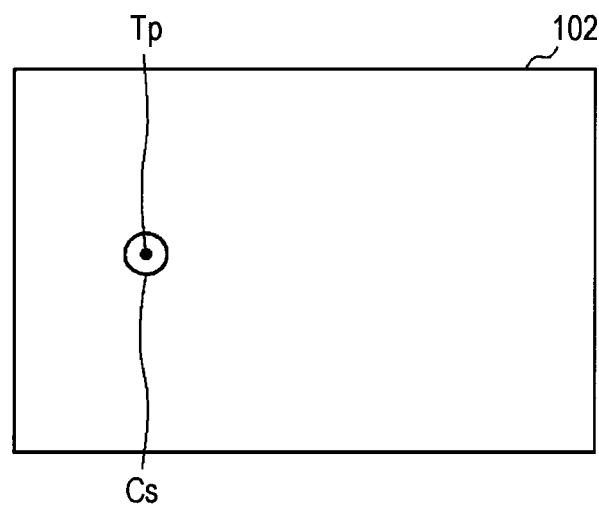
FIGS. 5A and 5B are schematic diagrams to accompany a description of a form of a mochi cursor.

Upon the finger of the user touching the touch screen 102, the CPU 110 displays a mochi cursor Cs, made of a circle of which the center is a touch position Tp, on the touch screen 102, as shown in FIG. 5A.

Figure 5B:
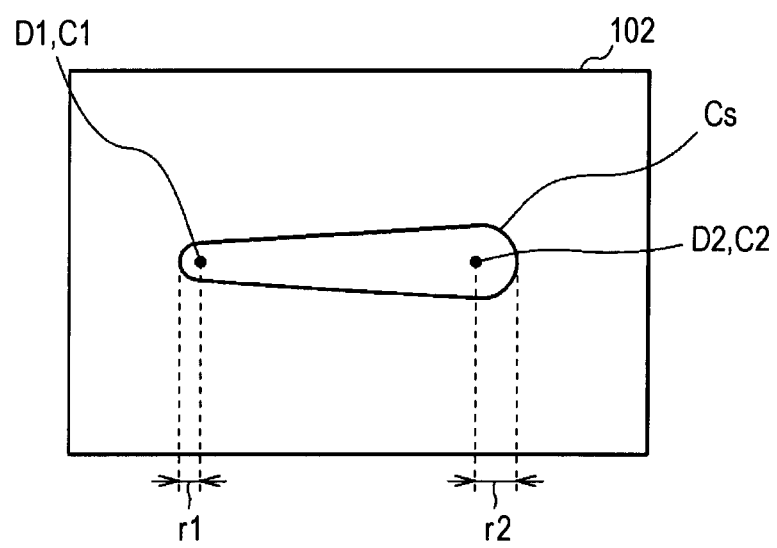

Subsequently, upon dragging being performed with the finger of the user not being released, the CPU 110 stretches the mochi cursor Cs from the dragging starting point D1 (i.e. the first touch position Tp) to the ending point D2 (current touch position), as shown in FIG. 5B.

Thus the portable terminal 100 can enable to user to confirm that the touch operation is accepted as a dragging, while enabling dragging to be performed with a sensation of directly touching and stretching the mochi cursor Cs.

Also, by the mochi cursor Cs thus stretching from the dragging starting point D1 to the ending point D2, the user can confirm the distance from the dragging starting point D1 to the ending point D2 (starting point-ending point distance).

Note that the position corresponding to the dragging starting point D1 within the mochi cursor Cs hereafter will be a starting point C1 of the mochi cursor Cs, and the position corresponding to the dragging ending point D2 hereafter will be an ending point C2 of the mochi cursor Cs. That is to say, the mochi cursor Cs stretches from the starting point C1 corresponding to the dragging starting point D1 to the ending point C2 corresponding to the dragging ending point D2.

Also, the mochi cursor C2 has a shape that grows wider, facing the ending point C2 side from the starting point C1 side. That is to say, the shape is such that near the starting point C1 side is narrowest, and near the ending point C2 side is widest.

By displaying a mochi cursor Cs with such a shape, the user can distinguish between the dragging starting point D1 side and ending point D2 side of the mochi cursor Cs. Also consequently, the user can confirm the direction from the dragging starting point D1 to the ending point D2 (i.e. the starting point-ending point direction). Further, the positions of the dragging starting point D1 and ending point D2 (i.e. the starting point-ending point positions) can be confirmed.

Also, while dragging, the starting point C1 of the mochi cursor Cs corresponding to the dragging starting point D1 is fixed, whereas the ending point C2 of the mochi cursor Cs corresponding to the dragging ending point D2 moves according to the finger movement. Thus, the portable terminal 100 can enable the user to perform dragging while confirming the dragging starting point-ending point distance, starting point-ending point direction, and starting point-ending point positions.

Further, the end portion of the starting point C1 side of the mochi cursor Cs is a semi-circle having a radius r1 of which the starting point C1 is the center. Thereby the user can confirm that the center of the semi-circle is the position of the dragging starting point D1. Thus, the user can more accurately confirm the position of the dragging starting point D1.

Similarly, the end portion of the ending point C2 side of the mochi cursor Cs is a semi-circle having a radius r2 of which the ending point C2 is the center. Thereby the user can confirm that the center of the semi-circle is the position of the dragging ending point D2. Thus, the user can more accurately confirm the position of the dragging ending point D2.

Note that as the mochi cursor Cs becomes wider facing the ending point C2 side from the starting point C1 side, the radius r2 of the ending point C2 side is set to a greater value than the radius r1 of the starting point C1 side. Thus, the mochi cursor C2 has a shape wherein a circle having a radius r1 of which the center is the starting point C1 and a circle having a radius r2 that is greater than the circle having a radius r1, of which the center is the ending point C2, are connected.

Also, the CPU 110 displays the mochi cursor Cs so as to be translucent, and shows through the images in the background of the mochi cursor Cs.

Further, upon the finger being released from the touch screen 102 and the dragging ending, the CPU 110 brings the ending point C2 side of the mochi cursor Cs close to the starting point C1 side and shrinks the mochi cursor Cs into a circle, then deletes this from the screen.

Also, according to the positions of the starting point C1 and ending point C2, direction from the starting point C1 to the ending point C2, and distance from the starting point C1 to the ending point C2 of the displayed mochi cursor, the CPU 110 can accept various operation inputs.

Note that hereafter, the direction from the starting point C1 of the mochi cursor Cs to the ending point C2 will be called the mochi cursor Cs direction, and the distance from the starting point C1 of the mochi cursor Cs to the ending point C2 will be called the mochi cursor Cs length, as appropriate.

The CPU 110 controls the playing speed of moving pictures, for example, according to operation input by the mochi cursor Cs. We will say that the CPU 110 plays the moving pictures at 1× speed in sequence, and for example as shown in FIG. 6, displays the moving pictures to be horizontal as to a horizontally-faced touch screen 102.

Now, for example, let us say that dragging in a horizontal direction of the screen is performed. The CPU 110 displays the mochi cursor Cs on the screen that stretches in the horizontal direction from the dragging starting point to the ending point, according to the dragging thereof.

If the facing direction of the mochi cursor Cs is right facing as shown in FIG. 7A, the CPU 110 sets the sign of the playing speed to be + (i.e. the playing direction is the forward direction), and plays the moving pictures faster than the 1× speed in the forward direction (i.e. fast forwards). On the other hand, if the facing direction of the mochi cursor Cs is left facing, the CPU 110 sets the sign of the playing speed to be—(i.e. the playing direction is the reverse direction), and plays the moving pictures faster than the 1× speed in the reverse direction (i.e. rewinds).

Figure 8:
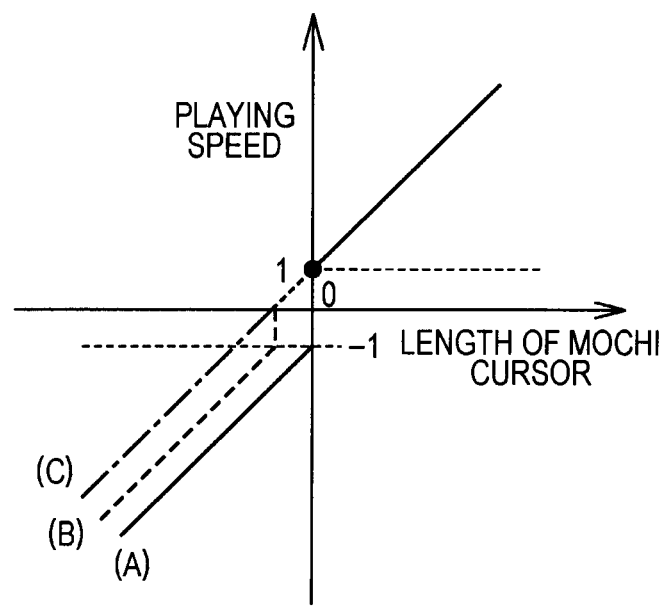
FIG. 8 is a schematic diagram to accompany a description of a control (3) of playing speed.

Also at this time the CPU 110 sets the value of the playing speed to a greater value as the length of the mochi cursor Cs increases, as indicated by (A) in FIG. 8. In the graphs in FIG. 8 and thereafter, the sign of the length of the mochi cursor Cs is + when the mochi cursor Cs is facing right (or upwards), and the sign of the length of the mochi cursor Cs is − when the mochi cursor Cs is facing left (or downwards).

Thus, with the portable terminal 100, the moving pictures can be fast-forwarded or rewound at a desired playing speed by the operation inputs from the mochi cursor Cs, while showing the user the dragging starting point-ending point direction and starting point-ending point distance with the mochi cursor Cs.

Subsequently, upon the finger being released from the touch screen 102 and the dragging ended, the CPU 110 shrinks the mochi cursor Cs and deletes this from screen. Simultaneously, the CPU 110 plays the moving picture again in the forward direction at 1× speed.

Also, as shown in FIG. 7B and (B) in FIG. 8, a playing mode that plays the moving pictures in slow motion (i.e. playing slower than 1× speed in the forward direction) according to operation input with the mochi cursor Cs may be provided separately.

In this case, similar to the case shown in the above-described FIG. 7A and (A) in FIG. 8, if the direction of mochi cursor Cs is right-facing, the CPU 110 plays the moving pictures in the forward direction faster than 1× speed (i.e. fast forwards). Also at this time the CPU 110 sets the value of the playing speed to a greater value as the length of the mochi cursor Cs increases.

On the other hand, if the direction of mochi cursor Cs is left-facing, and the length of the mochi cursor Cs is shorter than a predetermined value, the CPU 110 plays the moving pictures in the forward direction slower than 1× speed (i.e. slow-motion playing). Also at this time the CPU 110 sets the value of the playing speed to a smaller value as the length of the mochi cursor Cs increases (i.e. slows the playing speed of the slow-motion playing).

Also if the direction of mochi cursor Cs is left-facing, and the length of the mochi cursor Cs is greater than a predetermined value, the CPU 110 plays the moving pictures in the reverse direction faster than 1× speed (i.e. rewinds). Also at this time the CPU 110 sets the value of the playing speed to a greater value as the length of the mochi cursor Cs increases (i.e. speeds up the playing speed of the rewinding).

Further, as shown in FIG. 7C and (C) in FIG. 8, a playing mode that is a slow motion reverse playing (i.e. playing slower than 1× speed in the reverse direction) in addition to the slow-motion playing of the moving pictures according to operation input with the mochi cursor Cs may be provided separately.

In this case, similar to the case shown with the above-described FIG. 7A and (A) in FIG. 8, if the direction of the mochi cursor Cs is right-facing, the CPU 110 plays the moving pictures in the forward direction faster than 1× speed (i.e. fast forwards). Also at this time the CPU 110 sets the value of the playing speed to a greater value as the length of the mochi cursor Cs increases.

On the other hand, similar to the case shown with the above-described FIG. 7B and (B) in FIG. 8, in the case that the direction of the mochi cursor Cs is left-facing and the length of the mochi cursor Cs is shorter than a predetermined first value, the CPU 110 plays the moving pictures slower than 1× speed in the forward direction (slow-motion playing). Also at this time the CPU 110 sets the value of the playing speed to a smaller value as the length of the mochi cursor Cs increases (i.e. slows the playing speed of the slow-motion playing).

Also, in the case that the direction of the mochi cursor Cs is left-facing and the length of the mochi cursor Cs is greater than a predetermined first value and shorter than a predetermined second value, the CPU 110 plays the moving pictures slower than 1× speed in the reverse direction (slow-motion reverse playing). Also at this time the CPU 110 sets the value of the playing speed to a greater value as the length of the mochi cursor Cs increases (i.e. speeds up the playing speed of the slow-motion reverse playing).

Further, in the case that the direction of the mochi cursor Cs is left-facing and the length of the mochi cursor Cs is greater than a predetermined second value, the CPU 110 plays the moving pictures in the reverse direction faster than 1× speed. Also at this time the CPU 110 sets the value of the playing speed to a greater value as the length of the mochi cursor Cs increases (i.e. speeds up the playing speed of the rewinding).

Further, in addition to these playing modes, an editing mode to perform editing of the moving pictures can also be provided separately. In the case of the editing mode, the CPU 110 sets the playing speed to "0" in a state wherein dragging is not performed (i.e. displays the moving pictures in the state of being temporarily stopped.

Figure 9:
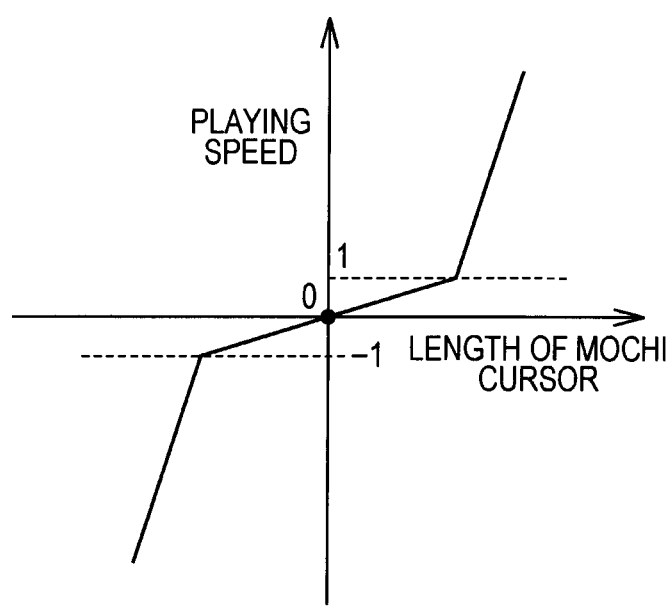
FIG. 9 is a schematic diagram to accompany a description of the control of playing speed when in editing mode.

When dragging is performed, if the direction of the mochi cursor Cs is right-facing, the CPU 110 causes the sign of the playing speed to be + (i.e. the playing direction is the forward direction), and the value of the playing speed is further increased from the state of "0" playing speed as the mochi cursor Cs becomes longer, as shown in FIG. 9.

On the other hand, if the direction of the mochi cursor Cs is left-facing, the CPU 110 causes the sign of the playing speed to be − (i.e. the playing direction is the reverse direction), and the value of the playing speed is further increased from the state of "0" playing speed as the mochi cursor Cs becomes longer.

Also at this time, when the playing speed is slower than 1× speed in the forward direction or reverse direction, as compared to when the playing speed is faster than 1× speed in the forward direction or reverse direction, the CPU 110 causes the degree of increase or degree of decrease of the playing speed as to the length of the mochi cursor Cs to be gentle.

Now, with the editing mode, the playing speed can be more finely adjusted during slow-motion playing or slow-motion reverse playing of the moving pictures.

Subsequently, upon the finger being released from the touch screen 102 and the dragging ending, the CPU 110 shrinks the mochi cursor Cs and deletes this from the screen. Simultaneously, the CPU 110 sets the playing speed of the moving pictures to "0" again (i.e. displays the moving pictures in the state of being temporarily stopped). Thus, the CPU 110 controls the playing speed of the moving pictures according to the operation input by the mochi cursor Cs.

Also, the CPU 110 controls the scrolling speed of various lists or images or the like, for example, according to the operation input by the mochi cursor Cs. Specifically, the CPU 100 controls the sign of the scrolling speed (i.e. scrolling direction) according to the direction of the mochi cursor Cs, and controls the value of the scrolling speed according to the length of the mochi cursor Cs.

Figure 10A:
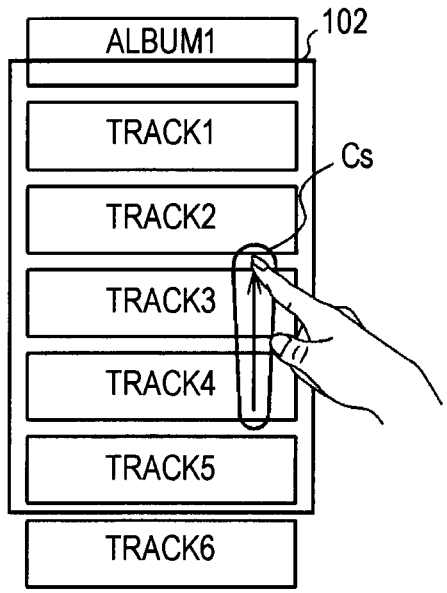
FIGS. 10A through 10C are schematic diagrams to accompany a description of a control of scrolling speed.

For example, as shown in FIG. 10A, let us as say that a list of tune (track) titles arrayed in a vertical column (also called track list) is displayed on a vertical-facing touch screen 102.

Now, upon dragging in the vertical direction of the screen being performed, the CPU 110 displays on the screen the mochi cursor Cs that stretches in the vertical direction from the dragging starting point to the ending point in accordance with this dragging.

If the direction of the mochi cursor Cs is upward-facing, the CPU 110 sets the sign of the scrolling speed to +, whereby the scrolling direction is the direction of scrolling the track list from the top towards the bottom. Also on the other hand, if the direction of the mochi cursor Cs is downward-facing, the CPU 110 sets the sign of the scrolling speed to −, whereby the scrolling direction is the direction of scrolling the track list from the bottom towards the top.

Figure 10B:
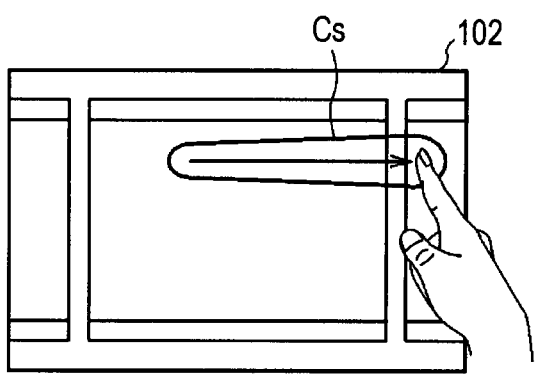
Figure 10C:
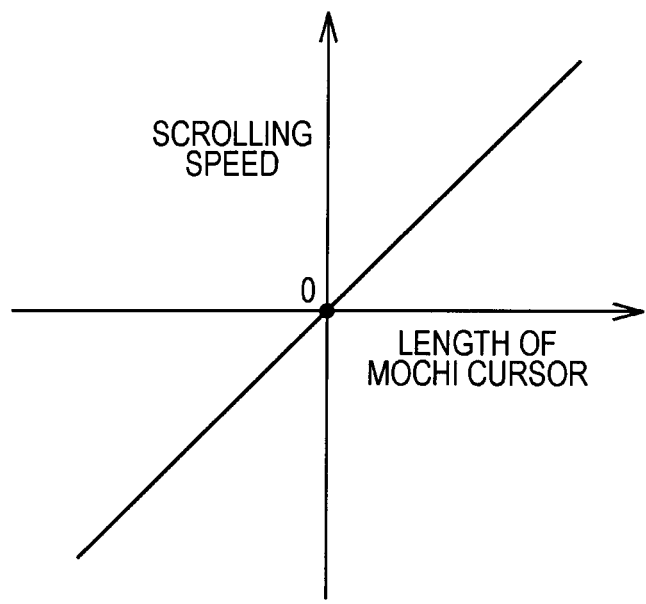

Further, as shown in FIG. 10C, the CPU 110 sets the value of the scrolling speed to a greater value as the length of the mochi cursor Cs increases.

Also on the other hand, for example, as shown in FIG. 10B, let us as say that a list of multiple still images arrayed in a horizontal line is displayed on a horizontal-facing touch screen 102.

Now, upon dragging in the horizontal direction of the screen being performed, the CPU 110 displays on the screen the mochi cursor Cs that stretches in the horizontal direction from the dragging starting point to the ending point in accordance with this dragging.

If the direction of the mochi cursor Cs is right-facing, the CPU 110 sets the sign of the scrolling speed to +, whereby the scrolling direction is the direction of scrolling the still images from right towards left. Also on the other hand, if the direction of the mochi cursor Cs is left-facing, the CPU 110 sets the sign of the scrolling speed to −, whereby the scrolling direction is the direction of scrolling the still images from left toward right.

Further, as shown in FIG. 10C, the CPU 110 sets the value of the scrolling speed to a greater value as the length of the mochi cursor Cs increases.

Thus, the portable terminal 100 can show the dragging starting point-ending point direction and starting point-ending point distance to the user, while enabling scrolling various lists and images or the like with operation inputs from the mochi cursor Cs in a desired direction at a desired speed.

Note that upon the dragging ending, the CPU 110 brings the ending point side of the mochi cursor Cs close to the starting point side and shrinks the mochi cursor Cs which has been stretched, into a circle, then deletes the mochi cursor Cs from the screen and ends the scrolling.

Further, according to the operation input by the mochi cursor Cs, the CPU 110 controls the adjusting speed of various parameters (volume and image zooming scale, luminance, chroma, etc), for example. Specifically the CPU 110 controls the sign of the parameter adjustment speed (i.e. adjustment direction) according to the direction of the mochi cursor Cs, and controls the value of the adjustment speed according to the length of the mochi cursor Cs.

Figure 11A:
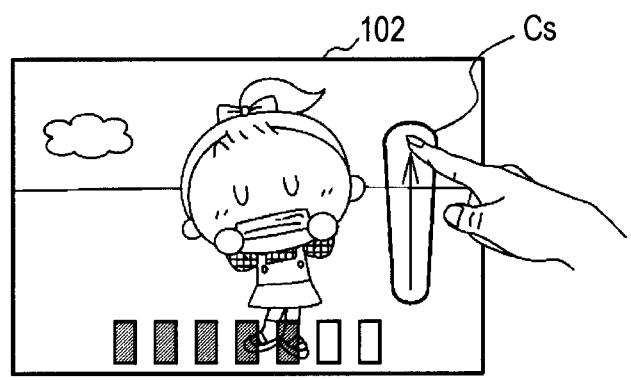
FIGS. 11A and 11B are schematic diagrams to accompany a description of control of parameter adjusting speed.

For example, as shown in FIG. 11A, let us say that a horizontal moving picture is displayed on a horizontal-facing touch screen 102. Upon dragging being performed in the vertical screen direction, the CPU 110 displays on the screen the mochi cursor Cs that stretches in the vertical direction from the dragging starting point to the ending point in accordance with the dragging.

If the direction of the mochi cursor Cs is upward-facing, the CPU 110 causes the sign of the volume adjustment speed to be +, and the adjustment direction to be the direction of increased volume. On the other hand, if the direction of the mochi cursor Cs is downward-facing, the CPU 110 causes the sign of the volume adjustment speed to be −, and the adjustment direction to be the direction of decreased volume.

Figure 11B:
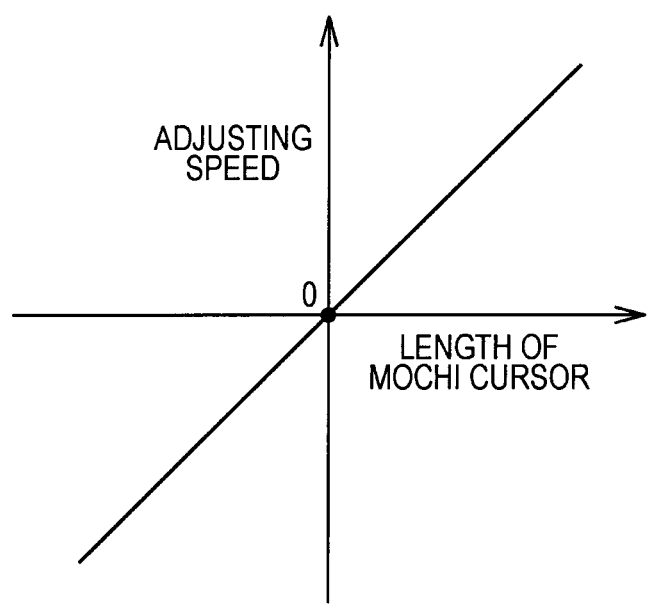

Also, as shown in FIG. 11B, the CPU 110 sets the value of volume adjustment speed to be a greater value as the length of the mochi cursor Cs is increased at this time.

Note that upon dragging ending, the CPU 110 shrinks the mochi cursor Cs and deletes this from the screen, and ends the volume adjustment. Hereafter, the volume immediately preceding the dragging being ended is maintained.

Thus, the portable terminal 100 can increase/decrease to adjust the volume which is an audio parameter associated with the moving picture at a desired adjustment speed, with the operation input from the mochi cursor Cs, while showing the user the dragging starting point-ending point direction and starting point-ending point distance with the mochi cursor Cs.

Thus, when dragging is performed, the portable terminal 100 displays the mochi cursor Cs showing the starting point-ending point positions, starting point-ending point direction, and starting point-ending point distance, and accepts various operation inputs according to the direction and length of the mochi cursor Cs.

2-3-2. Operation Input Examples with Various Applications

Next, the operation input from the mochi cursor Cs described above will be described in further detail, using an example of operation input with an application installed on the portable terminal 100. Note that various types of applications can be installed on the portable terminal 100, but as an example here, we will say that an application to play music, and application to play still images, and an application to play moving pictures, are installed.

First, operation input from the mochi cursor Cs with the application to play moving pictures (also called a moving picture playing application) will be described in detail. In a state wherein icons corresponding to a moving picture playing application startup are displayed on the touch screen 102, the user has tapped an icon, the CPU 110 accepts the touch operation as operation input that starts the moving picture playing application.

The CPU 110 reads out and executes the moving picture playing application program from the nonvolatile memory 111, and starts the moving picture playing application. Upon starting the moving picture playing application, the CPU 110 displays a list of thumbnails of the moving pictures stored in the nonvolatile memory 111 as moving picture files on the touch screen 102. Further, upon one of the thumbnails displayed as a list having been tapped, the CPU 110 accepts the touch operation as operation input to play the moving picture. The CPU 110 obtains a moving picture from the moving picture file corresponding to the tapped thumbnail.

Figure 12:
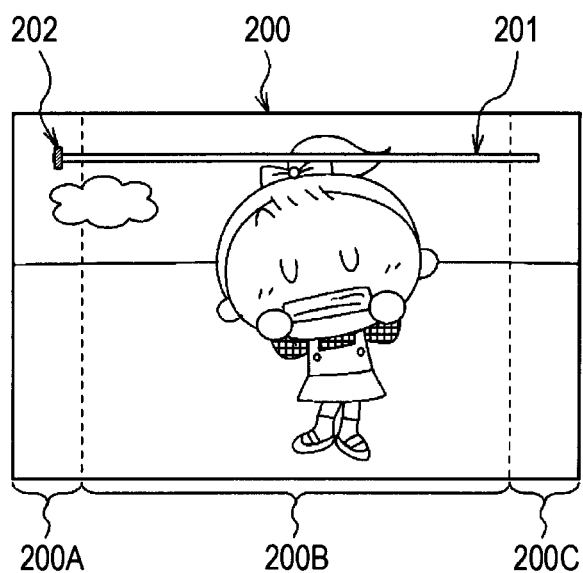
FIG. 12 is a schematic diagram illustrating a configuration of a moving picture playing screen.

Further, at this time the CPU 110 displays a moving picture playing screen 200 shown in FIG. 12 on the touch screen 102. Note that the moving picture playing screen 200 is a horizontal screen, assumes horizontal use, and is displayed on a full screen of the horizontal touch screen 102.

The moving picture is displayed so as to approximately fill the screen of the moving picture playing screen 200. Further, the moving picture playing screen 200 is displayed having a bar 201 extending from the left edge of the screen to the right edge so as to be layered on the moving picture close to the upper edge thereof. The bar 201 is arranged so that one end on the left edge side of the screen shows the beginning of the moving picture, and the other end on the right edge side of the screen shows the end of the moving picture, and the current playing position of the moving picture is shown by a moving pointer 202 on the bar 201. This bar may hereafter be called a playing bar 201.

Further, the moving picture playing screen 200 is divided horizontally into three parts, into a left edge region 200A, center region 200B, and right edge region 200C. Each of the left edge region 200A and right edge region 200C are roughly ⅙ of the size of the entire screen, for example, and the center region 200B is a size roughly of the remaining ⁴⁄₆. The functions of the left edge region 200A, center region 200B, and right edge region 200C will be described later.

The CPU 110 displays a moving picture played in the forward direction at 1× speed from the beginning chapter on such a moving picture playing screen 200. Note that the playing in 1× speed in the forward direction is also called normal playing.

Also, one set of moving pictures is divided into predetermined units (e.g. by scene), the partial moving pictures by unit are called chapters. That is to say, one set of moving pictures is made up of multiple chapters.

With the moving picture playing screen 200, playing the moving pictures can be controlled by dragging in the horizontal direction. Let us say that dragging in the horizontal direction of the screen is performed, as shown in FIG. 13A. The CPU 110 displays a mochi cursor Cs that stretches from the dragging starting point to the ending point in the horizontal direction according to the dragging thereof on the screen. Note that the mochi cursor Cs continues to be displayed until the finger is released from the touch screen 102 and the dragging is ended.

Now, upon confirming that the direction of the displayed mochi cursor Cs is in the horizontal direction, the CPU 110 determines whether the ending point of the cursor Cs (i.e. end dragging ending point) is in the center region 200B of the screen or not. If the ending point of the cursor Cs is in the center region 200B of the screen, the CPU 110 controls the playing speed (values of the playing direction and playing speed) of the moving picture (i.e., chapter) displayed on the screen, according to the direction and length of the mochi cursor Cs.

Specifically, if the direction of the displayed mochi cursor Cs is right-facing, the CPU 110 sets the sign of the playing speed to +, whereby the playing direction is in the forward direction. Also on the other hand, if the direction of the displayed mochi cursor Cs is left-facing, the CPU 110 sets the sign of the playing speed to −, whereby the playing direction is in the reverse direction. Further, the value of the playing speed is set to a greater value as the length of the mochi cursor Cs increases.

Consequently, for example, if the mochi cursor Cs is extended a long ways to the right by dragging to the right direction of the screen, the moving pictures displayed on the moving picture playing screen 200 are quickly played in the forward direction (i.e. fast-forwarded).

Also, if the mochi cursor Cs is extended a short ways to the left by dragging to the left direction of the screen, the moving pictures displayed on the moving picture playing screen 200 are slowly played in the reverse direction (i.e. rewound).

Further, upon such dragging in the horizontal direction of the screen, if the finger is not moved and not removed from the touch screen 102, the mochi cursor Cs continues to be displayed without changing the direction and length thereof, and the playing speed (values of playing direction and playing speed) is maintained.

Thus, with the moving picture playing screen 200, the dragging starting point-ending point direction and starting point-ending point distance can be shown to the user by the mochi cursor Cs, while playing the moving pictures in the desired playing direction at a desired playing speed, with the operation inputs from the mochi cursor Cs. Note that description about audio associated with the moving pictures is omitted here, but similar to the moving pictures, playing the audio is also controlled by dragging.

Further, let us say that dragging is continued, and the ending point of the mochi cursor Cs is outside the center region 200B of the screen (i.e. enters the left edge region 200A or the right edge region 200C), as shown in FIG. 13B, for example. The CPU 110 then transfers the display content of the moving picture playing screen 200 from a chapter to a list of chapters (also called chapter list).

A chapter list is a list of representative still images extracted from a chapter (also called chapter images) in a horizontal line in the order of playing point-in-time. The chapter list is a list of representative chapter images extracted from each chapter, so we can say that this is information of the upper level as to a chapter.

Now, at this time, the CPU 110 is arranged so as to transfer the display content of the moving picture playing screen 200 from a chapter to a chapter list with is the upper level information thereof. Specifically, the CPU 110 zooms out the displayed chapter and displays a portion of the chapter list including a chapter image Cp(N) of the chapter playing immediately preceding the transfer to the picture playing screen 200, as shown in FIG. 13C.

FIG. 13C is an example wherein a chapter image Cp(N) is displayed in the center of the moving picture playing screen 200, a portion of the immediately preceding chapter image CP(N−1) is displayed on the left side thereof, and a portion of the next chapter image Cp(N+1) is displayed on the right side of the chapter image Cp(N).

Thus, with the moving picture playing screen 200, when transferring from a chapter to the chapter list, the chapter list is displayed so that the chapter image Cp(N) of the chapter played immediately preceding the transfer is positioned in the center of the screen. By doing so, the moving picture playing screen 200 can transfer seamlessly from chapter to chapter list, without causing the user any uneasiness.

Also, the mochi cursor Cs is continuously displayed on the moving picture playing screen 200 until the finger is released from the touch screen 102 and the dragging is ended, regardless of such display content transfer. That is to say, the mochi cursor Cs that stretches from within the center region 200B to outside of the center region 200B (i.e. within the left edge region 200A or right edge region 200C) in the horizontal direction is displayed on the moving picture playing screen 200.

The CPU 110 controls the scrolling speed (values of the scrolling direction and scrolling speed) of the chapter list displayed on the screen, according to the direction and length of the mochi cursor Cs to scroll through the chapter list. Specifically, if the direction of the displayed mochi cursor Cs is right-facing, the CPU 110 causes the chapter list scrolling direction to be in the left direction (i.e. the direction that the chapter image Cp moves to the left). On the other hand, if the direction of the displayed mochi cursor Cs is left-facing, the CPU 110 causes the chapter list scrolling direction to be in the right direction (i.e. the direction that the chapter image Cp moves to the right). Further, the CPU 110 sets the value of the scrolling speed to a greater value as the length of the mochi cursor Cs increases.

Consequently, for example, if the mochi cursor Cs is extended a long ways to the right by dragging to the right direction of the screen, the chapter list displayed on the moving picture playing screen 200 is scrolled in the left direction at a high speed. Also, if the mochi cursor Cs is extended a short ways to the left by dragging to the left direction of the screen, the chapter list displayed on the moving picture playing screen 200 is scrolled in the right direction slowly.

Further, upon such dragging in the horizontal direction of the screen, if the finger is not moved and not removed from the touch screen 102, the mochi cursor Cs continues to be displayed without changing the direction and length thereof, and the scrolling speed (values of scrolling direction and scrolling speed) is maintained.

Thus, with the moving picture playing screen 200, upon the ending point of the mochi cursor Cs entering the left edge region 200A or the right edge region 200C, the display content transfers from the chapter to the chapter list. Accordingly, with the moving picture playing screen 200 at this time, the chapter list can be scrolled at a desired speed with the operation inputs from the mochi cursor Cs, while the user is shown the dragging starting point-ending point direction and starting point-ending point distance with the mochi cursor Cs. Thus, the user can readily search the chapter images Cp of a desired chapter from the chapter list, via the moving picture playing screen 200.

Now, let us say that upon an optional chapter image Cp having been displayed in the center of the moving picture playing screen 200, the dragging has ended (i.e. the finger is removed from the touch screen 102). As shown in FIG. 13D, the CPU 110 then brings the ending point side of the mochi cursor Cs close to the starting point side and shrinks into a circle the mochi cursor Cs that has been stretched horizontally, then deletes the mochi cursor Cs from the screen.

At this time the CPU 110 transfers the display content of the moving picture playing screen 200 from the chapter list to a chapter serving as lower level information. Specifically, the CPU 110 zooms in the displayed chapter list, and displays the chapters corresponding to the chapter images Cp displayed in the center immediately preceding the transfer, from the beginning image thereof, to the moving picture playing screen 200, using normal playing.

Thus, when transferring from the chapter list to a chapter, playing is started from the chapter corresponding to the chapter image Cp displayed in the center of the screen immediately preceding the transfer. By doing so, the moving picture playing screen 200 can transfer seamlessly from chapter list to chapter, without causing the user any uneasiness. Further, a series of operations from searching for a chapter to playing the chapter can be easily performed by dragging just one time.

Let us say that after transferring to the chapter list, dragging is continued without the finger being released, and the ending point of the mochi cursor Cs returns from outside the center region 200B to within the center region 200B. In this case also, if the current display content is a chapter list, the CPU 110 continues to control the scrolling speed of the chapter list according to the direction and length of the mochi cursor Cs.

As described above, with the moving picture playing application, the horizontally-facing mochi cursor Cs is displayed on the moving picture playing screen 200 according to dragging in the horizontal direction. With the moving picture playing application, if the ending point of the displayed mochi cursor Cs is within the center region 200B, the CPU 110 sets the values of the chapter playing direction and playing speed according to the direction (left or right) and length of the mochi cursor Cs.

Thus, with the moving picture playing application, the values of the chapter playing direction and playing speed can be set freely and the chapter played, with only operation input from the mochi cursor Cs.

Also, with the moving picture playing application, if the ending point of the mochi cursor Cs enters the left edge region 200A or right edge region 200C according to the dragging, the display content is transferred from the chapter to the chapter list which is upper level information. At this time, with the moving picture playing application, the values of the scrolling direction and scrolling speed of the chapter list are set according to the direction and length of the mochi cursor Cs.

Subsequently, when dragging is ended, with the moving picture playing application, the display content is transferred from the chapter list to a chapter which is lower level information again, and starts playing from the beginning of the chapter. Thus, with the moving picture playing application, the chapter and chapter list can be switched, and the chapter list can be scrolled at a desired scrolling speed, with only operation input from the mochi cursor Cs according to the dragging in the horizontal direction.

Further, moving with the picture playing screen 200, volume which is an audio parameter associated with the moving picture can be adjusted by dragging in the vertical direction.

Figure 14A:
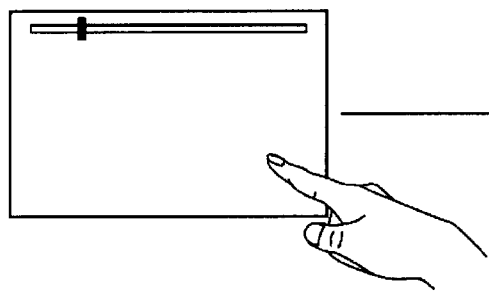
FIGS. 14A and 14B are schematic diagrams to accompany a description of a second operation input example by a mochi cursor with a moving picture application.
Figure 14B:
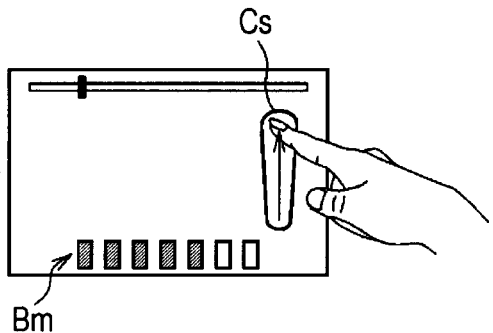

Let us say that dragging in the vertical direction of the screen is performed, as shown in FIG. 14A and FIG. 14B. The CPU 110 displays the mochi cursor Cs that stretches from the dragging starting point to the ending point in the vertical direction on the screen, according to the dragging.

Upon confirming that the direction of the displayed mochi cursor Cs is vertically-facing, the CPU 110 controls the volume adjustment speed (values of adjustment direction and adjustment speed) and increases or decreases the volume, according to the direction and length of the mochi cursor Cs at this time. Specifically, if the direction of the displayed mochi cursor Cs is upward-facing, the CPU 110 causes the sign of the volume adjustment speed to be +, and the adjustment direction to be the direction of increased volume. On the other hand, if the direction of the mochi cursor Cs is downward-facing, the CPU 110 causes the sign of the volume adjustment speed to be −, and the adjustment direction to be the direction of decreased volume. Further, the CPU 110 sets the value of volume adjustment speed to be a greater value as the length of the mochi cursor Cs is increased at this time.

Consequently, for example, if the mochi cursor Cs is stretched a long ways by dragging in the upward direction of the screen, the volume is increased all at once. Also, for example, if the mochi cursor Cs is stretched a short ways by dragging in the downward direction of the screen, the volume is decreased slowly.

Further, upon such dragging in the vertical direction of the screen, if the finger is not moved and not removed from the touch screen 102, the mochi cursor Cs continues to be displayed without changing the direction and length thereof, and the adjustment speed (values of adjustment direction and adjustment speed) is maintained.

Thus, with the moving picture playing screen 200, the volume can be adjusted to a desired adjustment speed with the direction and length of the dragging, while enabling the user to confirm the direction and length of the dragging by the mochi cursor Cs.

Also, the CPU 110 at this time displays a volume bar Bm that shows the current volume at a predetermined position on the screen (e.g. the central lower portion). Thus, the user can adjust the volume while visually recognizing the volume bar Bm and confirming the current volume.

Subsequently, upon the dragging ending, the CPU 110 brings the ending point side of the mochi cursor Cs close to the starting point side and shrinks into a circle the mochi cursor Cs that has been stretched vertically, then deletes the mochi cursor Cs from the screen, and ends the volume adjustment. Hereafter, the volume immediately preceding the dragging is maintained.

As described above, with the moving picture playing application, a vertically-facing mochi cursor Cs is displayed on the moving picture playing screen 200 according to the dragging in the vertical direction. With the moving picture playing application, the values of the volume adjustment direction and adjustment speed are set according to the direction (up or down) and length of the displayed mochi cursor Cs.

Thus, with the moving picture playing application, the volume can be adjusted while freely changing the adjustment direction and adjustment speed values, with only operation input from the mochi cursor Cs according to the dragging in the vertical direction.

Also, with the moving picture playing application, if dragging is in the vertical direction, the volume can be adjusted regardless of which portion of the screen where dragged is performed, whereby, for example, the user can view the moving pictures while performing dragging at an unimportant portion of the moving picture to adjust the volume.

Also, in the case that only audio of a moving picture is being listened to, for example, the volume can be readily adjusted by blind touch, without looking at the screen.

Next, operation inputs from a mochi cursor Cs with an application for playing tunes (tracks) (also called tune playing application) will be described in detail. In a state wherein icons corresponding to a tune playing application startup are displayed on the touch screen 102, the user has tapped an icon, the CPU 110 accepts the touch operation as operation input that starts the tune playing application.

The CPU 110 reads out and executes the tune playing application program from the nonvolatile memory 111, and starts the tune playing application. Upon starting the tune playing application, the CPU 110 displays a track selection screen 210 shown in FIG. 15 on the touch screen 102. Note that the track selection screen 210 is a vertical screen, assumes vertical use, and is displayed on a full screen of a vertical touch screen 102.

Further, the track selection screen 210 is divided vertically into three parts, into an upper edge region 210A, center region 210B, and lower edge region 210C. Each of the upper edge region 210A and lower edge region 210C are roughly ⅙ of the size of the entire screen, for example, and the center region 210B is a size roughly of the remaining ⅘. The functions of the upper edge region 210A, center region 210B, and lower edge region 210C will be described later.

The CPU 110 displays a track list on such a track selection screen 210. The track list is a list wherein tune (music) titles stored in the nonvolatile memory 111 as tune files are arrayed in a vertical column based on recorded album title and track number, for example. Specifically, the track list herein is a list of tracks arrayed in track order summarized by albums which are organized in order of titles.

Note that in addition to the track titles, the album title is inserted before (above, on the screen) the title of the first track of each album. That is to say, the track list has titles arranged as in, title of album 1, title of track number 1 of album 1, . . . , title of track number 5, title of album 2, title of track number 1 of album 2, etc.

Figure 15:
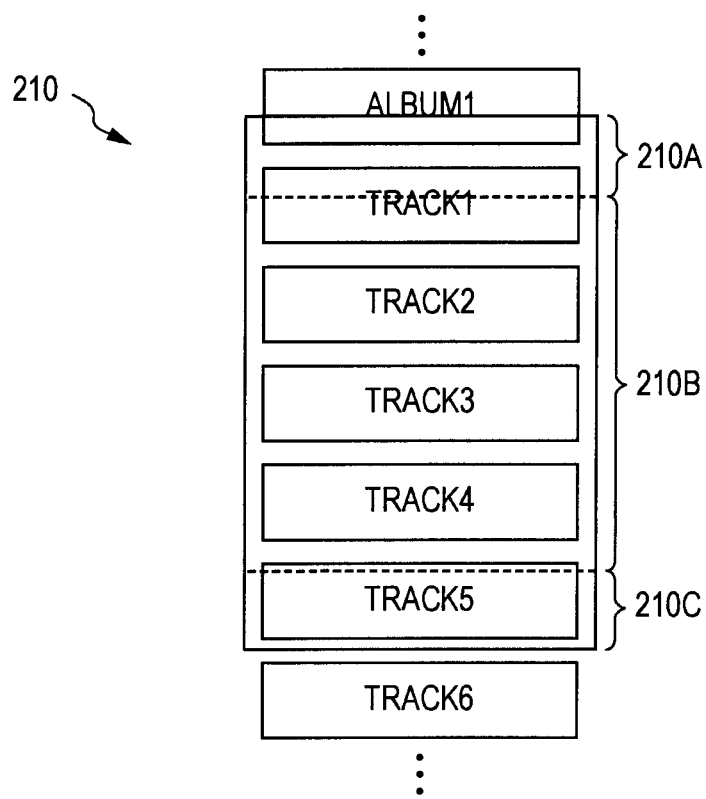
FIG. 15 is a schematic diagram illustrating a configuration of a track selecting screen.

At least a portion of the track list is displayed on the track selection screen 210. FIG. 15 is an example wherein the titles of five tracks of the titles included in the track list are displayed on the track selection screen 210.

Figure 16:
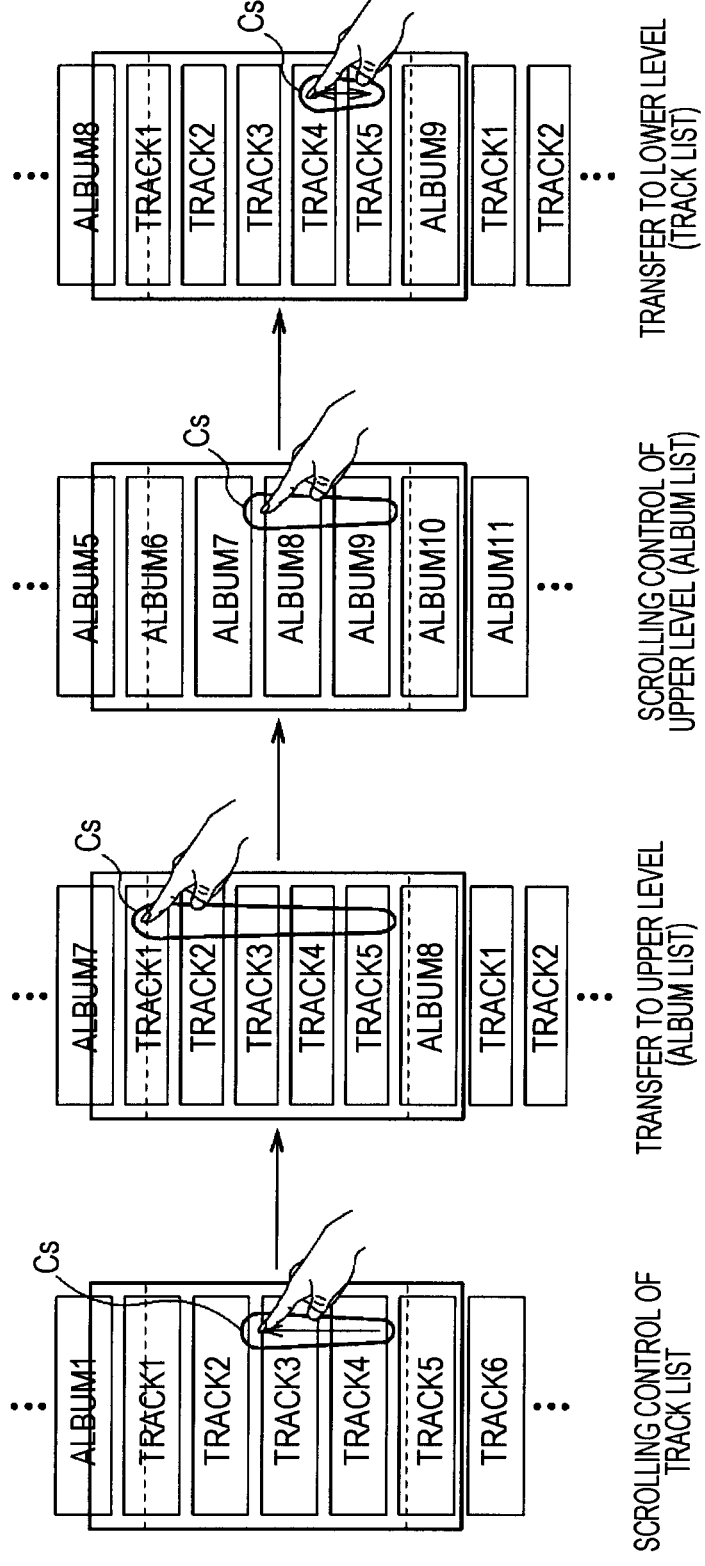
FIGS. 16A through 16D are schematic diagrams to accompany a description of an operation input example by a mochi cursor with a tune playing application.

Now, with the track selection screen 210, the scrolling speed (values of scrolling direction and scrolling speed) of the track list can be controlled by dragging in the vertical direction. Let us say that dragging is performed in the vertical direction of the screen, as shown in FIG. 16A. The CPU 110 displays on the screen the mochi cursor Cs that stretches in the vertical direction from the dragging starting point to the ending point according to the dragging. Note that the mochi cursor Cs continues to be displayed until the finger is released from the touch screen 102 and dragging is ended.

Now, upon confirming that the direction of the displayed mochi cursor Cs is in the vertical direction, the CPU 110 determines further whether the ending point of the mochi cursor Cs (i.e. the dragging ending point) is within the center region 210B of the screen. If the ending point of the mochi cursor Cs is within the center region 210B, the CPU 110 controls the scrolling speed of the track list to scroll the track list in accordance with the direction and length of the mochi cursor Cs.

Specifically, if the direction of the displayed mochi cursor Cs is the upward direction, the CPU 110 sets the scrolling direction of the track list to be the upward direction (i.e. the direction wherein the titles move to the bottom). On the other hand, if the direction of the displayed mochi cursor Cs is the downward direction, the CPU 110 sets the scrolling direction of the track list to be the downward direction (i.e. the direction wherein the titles move to the top). Further, the value of the scrolling speed is set to a greater value as the length of the mochi cursor Cs at this time lengthens.

Consequently, for example, if the mochi cursor Cs is stretched a long ways upward by dragging in the upper direction of the screen, the track list displayed on the track selection screen 210 is scrolled in the downward direction at a high speed.

Also, if the mochi cursor Cs is stretched a short ways downward by dragging in the in lower direction of the screen, the track list displayed on the track selection screen 210 is scrolled in the upward direction at a slow speed.

Further, upon such dragging in the vertical direction of the screen, if the finger is not moved and not removed from the touch screen 102, the mochi cursor Cs continues to be displayed without changing the direction and length thereof, and the scrolling speed (values of scrolling direction and scrolling speed) is maintained.

Thus, with the track selection screen 210, the dragging starting point-ending point direction and starting point-ending point distance can be shown to the user by the mochi cursor Cs, while scrolling the track list at a desired scrolling speed, with the operation inputs from the mochi cursor Cs. Thus, the user can readily search for the title of a desired track from the track list.

Further, as shown in FIG. 16B, as the ending point of the mochi cursor Cs nears the upper edge region 210A or the lower edge region 210C, the display size of only the titles of the tracks of the titles included in the track list is gradually reduced. Thus, as the display size of the track titles is gradually reduced, the display spacing between the album titles included in the track list is gradually narrowed like an accordion fold being folded away.

Let us say that the ending point of the mochi cursor Cs has entered the upper edge region 210A or the lower edge region 210C. The CPU 110 deletes the track title from the screen finally, as shown in FIG. 16C, and transfers the display content to a list of only album titles. This list is also called an album list.

Note that the album list is a list of album titles which is the upper level of the track titles, and thereby is upper level information as to the track list. That is to say, at this time, the CPU 110 transfers the display content of the track selection screen 210 from the track list to the album list which is upper level information thereof.

Thus, by gradually reducing the display size of the track titles of the titles included in the track list, and finally deleting this from the screen, the display content of the screen is transferred from the track list to the album list. Thus, with the track selection screen 210, transfers can be made seamlessly from the track list to the album list without causing the user any uneasiness.

Also, the mochi cursor Cs continues to be displayed on the track selection screen 210 until the dragging is ended, regardless of such display content transfer. That is to say, a mochi cursor Cs that stretches in the vertical direction from within the center region 210B to outside the center region 210B (i.e. the upper edge region 210A or lower edge region 210C) is displayed on the track selection screen 210.

Now, while the length of the displayed mochi cursor Cs is exceeding a predetermined threshold, the CPU 110 controls the scrolling speed of the album list displayed on the screen, according to the direction and length of the mochi cursor Cs, and scrolls through the album list.

Specifically, if the direction of the displayed mochi cursor Cs is upward facing, the CPU 110 sets the album list scrolling direction to be in the upwards direction (i.e. the direction of the titles moving down). On the other hand, if the direction of the displayed mochi cursor Cs is downward facing, the CPU 110 sets the album list scrolling direction to be in the downwards direction (i.e. the direction of the titles moving up). Further, the value of the scrolling speed is set to a greater value as the length of the mochi cursor Cs at this time lengthens.

Consequently, for example, if the mochi cursor Cs is stretched a long ways upward by dragging in the in upper direction of the screen, the album list displayed on the track selection screen 210 is scrolled in the downward direction at a high speed.

Also, if the mochi cursor Cs is stretched a short ways downward by dragging in the in lower direction of the screen, the album list displayed on the track selection screen 210 is scrolled in the upward direction at a slow speed.

Further, upon such dragging in the vertical direction of the screen, if the finger is not moved and not removed from the touch screen 102, the mochi cursor Cs continues to be displayed without changing the direction and length thereof, and the scrolling speed (values of scrolling direction and scrolling speed) is maintained.

Thus, with the track selection screen 210, the dragging starting point-ending point direction and starting point-ending point distance can be shown to the user by the mochi cursor Cs, while scrolling the album list at a desired scrolling speed, with the operation inputs from the mochi cursor Cs. Thus, the user can readily search for the title of a desired album from the album list.

Now, let us say that the dragging is further continued, and as shown in FIG. 16D the dragging ending point nears the starting point, whereby the length of the mochi cursor Cs shrinks to the predetermined threshold or less.

The CPU 110 then transfers the display content of the track selection screen 210 from the album list to the track list which is lower level information. Specifically, by inserting and displaying the track title between an album title and album title included in the album list, the display content is transferred from the album list to the track list. Let us say that the display size of the track title at this time is the same size as the display size immediately preceding transfer from the track list to the album list, for example.

The CPU 110 gradually increases the display size of the track title while returning to the original size, as the length of the mochi cursor Cs is shortened.

As the display size of the track title thus gradually increases, the display spacing of album titles included in the track list is gradually widened like an accordion fold being unfolded.

Thus, by inserting the track title between the album titles included in the album list, and gradually returning the display size thereof to the original size, the display content is transferred from the track list to the album list. By doing so, with the track selection screen 210, transfers can be made seamlessly from the album list to the track list without causing the user any uneasiness. Also, the user can smoothly perform album searches and track searches with only dragging in the vertical direction.

Let us say that subsequently, the dragging is ended (i.e. the finger is released from the touch screen 102). The CPU 110 brings the ending point side of the mochi cursor Cs close to the starting point side and shrinks the mochi cursor Cs that has been stretched in the vertical direction into a circle, then deletes this from the screen.

Further, the CPU 110 returns the display size of the track title included in the track list to the original size. Note that in the case that the album list is displayed when the dragging is ended, the CPU 110 inserts the track title into the album list, so as to transfer the display content to the track list.

Now, let us say that by one of the track titles displayed on the track selection screen 210 having been tapped, this track is selected. The CPU 110 obtains the audio of the track from the music file corresponding to the tapped track title, and outputs the audio from a headphone terminal (unshown).

As described above, with the tune playing application, a vertical-facing mochi cursor Cs is displayed on the track selection screen 210 according to the vertically-facing dragging. With the tune playing application, if the ending point of the displayed mochi cursor Cs is within the center region 210B, the values of the scrolling direction and scrolling speed of the track list are set according to the direction (up or down) and length of the mochi cursor Cs.

Further with the tune playing application, upon the ending point of the mochi cursor Cs leaving the center region 210B and enters the upper edge region 210A or lower edge region 210C according to the dragging, the display content is transferred from the track list to the album list with is upper level information.

At this time, with the tune playing application, the values of the scrolling direction and scrolling speed of the album list are set according to the direction and length of the mochi cursor Cs.

Subsequently, upon the length of the mochi cursor Cs becoming the predetermined threshold or less, with the tune playing application, the display content is transferred from the album list again to the track list which is low level information.

Thus, with the tune playing application herein, the track list and album list can be switched, and the track list and album list scrolled at a desired speed, with only the operation inputs from the mochi cursor Cs. Also, the user can readily perform album searches and track searches.

Next, operation inputs from the mochi cursor Cs with an application to play still images (also called still image playing application) will be described in detail.

In a state wherein icons corresponding to a still image application startup are displayed on the touch screen 102, the user has tapped an icon, the CPU 110 accepts the touch operation as operation input that starts the still image playing application. The CPU 110 reads out and executes the still image playing application program from the nonvolatile memory 111, and starts the still image playing application.

Upon starting the still image playing application, the CPU 110 displays a list of thumbnails of the still images stored in the nonvolatile memory 111 as still image files on the touch screen 102.

Further, upon one of the thumbnails displayed as a list having been tapped, the CPU 110 accepts the touch operation as operation input to play the still image. The CPU 110 obtains a still image from the still image file corresponding to the tapped thumbnail.

Figure 17:
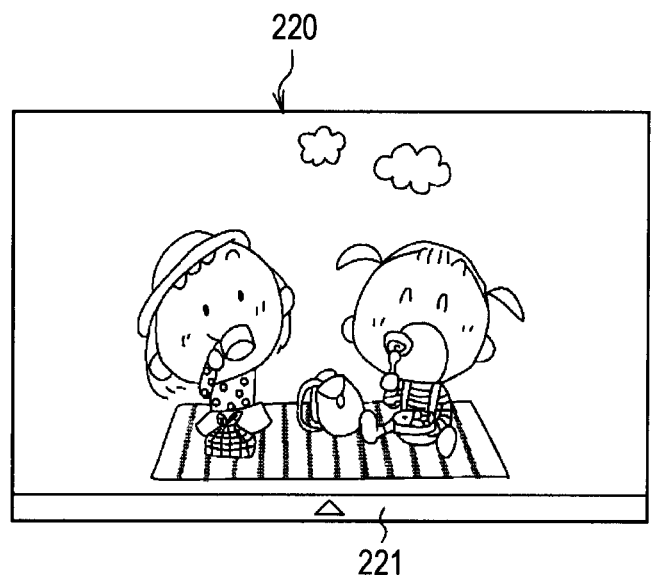
FIG. 17 is a schematic diagram illustrating a configuration of a still image playing screen.

Further, at this time the CPU 110 displays a still image playing screen 220 shown in FIG. 17 on the touch screen 102. Note that the still image playing screen 220 is a horizontal screen, assumes horizontal use, and is displayed on a full screen of the horizontal touch screen 102.

The still image is displayed so as to approximately fill the screen of the still image playing screen 220. Further, an upper edge portion of a palette 221 is displayed on the lower edge of the still image playing screen 220. By touching the upper edge portion thereof and dragging towards the upper direction of the screen, the palette 221 can be pulled out and displayed on the still image playing screen 220. The palette 221 herein is a palette for adjusting luminance and chroma which are still image parameters (this is also called a luminance-chroma palette), and the details thereof will be described later.

With the still image playing screen 220, adjustment speed (values of the adjustment direction and adjustment speed) of the zooming scale which is a still image parameter can be controlled by dragging in the vertical direction as to the displayed still image.

Let us say that an optional location of a still image is continuously touched for longer than a predetermined amount of time, as shown in FIG. 18A. Now, a touch for longer than the predetermined time is also called longpressing, and a touch for shorter than the predetermined time is also called short-pressing.

In a position where a still image has been long-pressed, the CPU 110 displays a circular mochi cursor Cs having this position as the center thereof. This position becomes the starting point of the mochi cursor Cs. Also, the CPU 110 displays, near the left side of the mochi cursor Cs, a vertically long rectangular-shaped zoom indicator Zi that shows that the operation input by dragging has switched to the adjustment of a still image zooming scale.

The zoom indicator Zi herein is translucent, for example, and shows through the still images displayed on the still image playing screen 220. Also, a character "+" is displayed on the upper portion of the zoom indicator Zi, and a character "−" is displayed on the lower portion thereof. Thus, the zoom indicator Zi shows that dragging in the upper direction of the screen corresponds to a plus of the zooming scale (i.e. zooming-in (enlarging)), and dragging in the lower direction of the screen corresponds to a minus of the zooming scale (i.e. zooming-out (reducing)).

Also, the CPU 110 sets an upper region 220A, center region 220B, and lower region 220C that divides the still image playing screen 220 into three parts in the vertical direction. The CPU 110 sets the center region 220B to have a predetermined length in the vertical direction (e.g. ⅓ of the length in the vertical direction of the screen) while having the long-pressed portion of the still image as the center in the vertical direction, and the remaining regions to be the upper region 220A and lower region 200C.

The center region 220B and zoom indicator Zi are formed so that the position and length in the vertical direction match. Thus, the zoom indicator Zi also shows the range of the center region 200B in the vertical direction. Note that the mochi cursor Cs and zoom indicator Zi are displayed until the finger is released from the touch screen 102.

Let us say that dragging is performed in the vertical direction of the screen, as shown in FIG. 18B, without releasing the finger that is long-pressing. The CPU 110 stretches the mochi cursor Cs in the vertical direction from the dragging starting point (i.e. the position first long-pressed) to the ending point, according to the dragging.

Upon confirming that the direction of the mochi cursor Cs is in the vertical direction, the CPU 110 adjusts the zooming scale (expansion scale/reduction scale) of the still image according to the dragging, having the center of the still image playing screen 220 as the zooming center. Specifically, the CPU 110 determines whether the ending point of the mochi cursor Cs (i.e. the dragging ending point) is inside or outside of the center region 220B.

If the ending point of the mochi cursor Cs is within the center region 220B, the CPU 110 increases/decreases the zooming scale of the still image by an amount equivalent to the amount of dragging.

Specifically, if the dragging direction is in the upper direction of the screen, the CPU 110 increases the zooming scale of the still image, and if the dragging direction is in the lower direction of the screen, decreases the zooming scale of the still image.

At this time the CPU 110 sets the values to increase/decrease the zooming scale, according to the position of the dragging ending point in the vertical direction. The values to increase/decrease the zooming scale herein increase as the position change of the dragging ending point in the vertical direction increases. Thus, the zooming scales is increased/decreases by an amount equivalent to the amount of dragging, whereby the zooming scale is not increased/decreased while the finger is stopped, even if the finger continues to touch the screen.

By doing so, for example if the dragging is in the upper direction of the screen, the zooming scale of the still image is increased by an amount equivalent to the amount of dragging, and the still image displayed on the still image playing screen 220 is enlarged.

Also, for example, if the dragging is in the lower direction of the screen, the zooming scale of the still image is decreased by an amount equivalent to the amount of dragging, and the still image displayed on the still image playing screen 220 is reduced.

Further, for example, while the finger continues to touch the screen but the finger is stopped, the zooming scale of the still image is not increased/decreased, and the still image displayed on the still image playing screen 220 is not enlarged or reduced.

Also, let us say that the dragging in the vertical direction of the screen is continued, and the ending point of the mochi cursor Cs is outside of the center region 220B on the screen (i.e. in the upper region 220A or lower region 200C) as shown in FIG. 18(C), for example.

The CPU 110 switches the adjustment of the still image zooming scale from one that increases/decreases the zooming scale by an amount equivalent to the amount of dragging to one that controls the adjustment speed of the zooming scale according to the direction and length of the mochi cursor Cs and continuously increases/decreases the zooming scale.

Specifically, if the direction of the displayed mochi cursor Cs is upward facing, the CPU 110 sets the adjustment direction of the zooming scale to be a zooming-in (enlarging) direction (i.e. the direction wherein the zooming scale is increased from 100%). On the other hand, if the direction of the displayed mochi cursor Cs is downward facing, the CPU 110 sets the adjustment direction of the zooming scale to be a zooming-out (reducing) direction (i.e. the direction wherein the zooming scale is decreased from 100%). Further, the value of the adjustment speed of the zooming scale (enlarging scale/reducing scale) is set to a greater value as the length of the mochi cursor Cs at this time is lengthened.

The CPU 110 continues to increase/decrease the zooming scale from the zooming scale immediately preceding the switching of the still image zooming scale adjustment (i.e. immediately preceding the ending point of the mochi cursor Cs exiting the center region 220B), with an adjustment speed thus set every predetermined amount of time.

Thus, adjustments to the still image zooming scale are seamlessly switched from those wherein the zooming scale is increased/decreased by an amount equivalent to the amount of dragging to those wherein an adjustment speed of the zooming scale is set according to the direction and length of the mochi cursor Cs and the zooming scale is continuously increased/decreased, without causing the user any uneasiness.

Consequently, for example if the mochi cursor Cs is stretched a long ways upwards, the zooming scale of the still image is rapidly raised. Thus, the still image displayed on the still image playing screen 220 is quickly enlarged. Also, for example if the mochi cursor Cs is stretched a long ways downwards, the zooming scale of the still image is rapidly raised. Thus, the still image displayed on the still image playing screen 220 is quickly reduced.

Further, upon such dragging in the vertical direction of the screen, if the finger is not moved and not released from the touch screen 102, the direction and length of the mochi cursor Cs is continuously displayed, and the adjustment speed (values of adjustment direction and adjustment speed) at this time is maintained.

Thus, with the still image playing screen 220, the zooming scale of the still images can be adjusted at a desired adjustment speed, with the operation input from the mochi cursor Cs, while showing the user the dragging starting point-ending point direction and starting point-ending point distance with the mochi cursor Cs.

Let us say that subsequently the dragging is continued without the finger being released, and the ending point of the mochi cursor Cs returns from outside the center region 220B to within the center region 220B again.

At this time the CPU 110 switches the adjustments of the still image zooming scale from those wherein the adjustment speed of the zooming scale is controlled according to the direction and length of the mochi cursor Cs to those wherein the zooming scale is increased/decreased by an amount equivalent to the amount of dragging.

Specifically, the CPU 110 increases/decreases the zooming scale by an amount equivalent to the amount of dragging, similar to that described above, from the zooming scale immediate preceding the switchover of the still image zooming scale adjustments (i.e. immediately preceding the ending point of the mochi cursor Cs returning within the center region 220B).

Thus, adjustments to the still image zooming scale are seamlessly switched from those wherein the adjustment speed of the zooming scale is set according to the direction and length of the mochi cursor Cs and the zooming scale continuously increased/decreased to those wherein the zooming scale is increased/decreased by an amount equivalent to the amount of dragging, without causing the user any uneasiness.

Also, let us say that the finger is released and dragging is ended. The CPU 110 at this time shrinks the mochi cursor Cs down to a circle, then deletes this from the screen, and ends the zooming scale adjustments. Note that in the case of setting the zooming scale adjustment speed, the CPU 110 resets the zooming scale adjustment speed to 0. Hereafter, the zooming scale immediately preceding the dragging being ended is maintained.

Thus, the CPU 110 can switch between increasing/decreasing the zooming scale by an amount equivalent to the amount of dragging and setting the zooming scale adjustment speed according to the dragging and continuing to increase/decrease the zooming scale depending on whether or not the end point of the mochi cursor Cs is within the center region 220B.

Therefore with the still image playing screen 220, if the zooming scale is increased/decreased by an amount equivalent to the amount of dragging, the zooming scale can be readily adjusted. Also, with the still image playing screen 220, if the zooming scale adjustment speed is set according to the dragging and the zooming scale is continued to increase/decrease, the zooming scale can be adjusted without limiting the zooming scale adjustment range to dragging one time.

Additionally, with the still image playing screen 220, the switching herein can be performed by placing the ending point of the mochi cursor Cs (i.e. the dragging ending point) outside or inside the center region 220B. Accordingly, separate operations for these switches are not performed, and the switching herein can be performed together with the dragging for the zooming scale adjustments.

Thus, with the still image playing screen 220, adjustments can be readily made by dragging one time (i.e. a drag from the time of the finger touching the touch screen 102 until releasing), without limiting the zooming scale adjustment range.

Accordingly, for example, when the zooming scale is to be greatly changed, switching can be made wherein first the mochi cursor Cs is stretched greatly so that the ending point thereof is placed outside the center region 220B, whereby the adjustment speed of the zooming scale is set according to the dragging and the zooming scale continues to be increased/decreased. Thus, the zooming scale can be greatly changed by dragging one time, whereby the zooming scale can be roughly adjusted to be near the desired zooming scale.

Subsequently, by shrinking the mochi cursor Cs and returning the ending point thereof to within the center region 220B, the user can switch so that the zooming scale is increased/decreased by an amount equivalent to the amount of dragging. Therefore, the zooming scale can be readily adjusted, whereby fine adjustments to the zooming scale can also be made readily.

Thus with the still image playing screen 220, a series of operations from rough adjustments to fine adjustments of the zooming scale can be readily performed by dragging just one time.

Also, with the still image playing screen 220, upon an optional position on the still image being long-pressed, the mochi cursor Cs is displayed at the long-pressed position, and a zoom indicator Zi is displayed near the mochi cursor Cs.

Thus, confirmation can be made as to whether the mochi cursor Cs is extended in the vertical direction from the zoom indicator Zi showing the range of the center region 200B in the vertical direction, and can distinguish for the user whether or not the dragging ending point is within the center region 200B. Accordingly, the user can switch, as desired, whether to increase/decrease the zooming scale by an amount equivalent to the amount of dragging or whether to set the zooming scale adjustment speed according to dragging and continue to increase/decrease the zooming scale, while viewing the zoom indicator Zi and mochi cursor Cs.

Also, the zoom indicator Zi is displayed near the left side of the mochi cursor Cs, whereby even if dragging in the vertical direction is performed, the zoom indicator Zi is not hidden by the finger, so the user can confirm the zoom indicator Zi while dragging.

Also, with the still image playing screen 220, the displayed still image can be scrolled through without long-pressing, by performing dragging (or flicking) in an optional direction from short-pressing.

Let us say that dragging (or flicking) in an optional direction from short-pressing is performed. The CPU 110 controls the still image scrolling according to the direction and length of dragging (or direction and speed of flicking) and scrolls through the still image. Specifically, the CPU 110 scrolls through the still image in the amount corresponding to the dragging length (or by an amount equivalent to the amount corresponding to the flicking speed), in the direction opposite from the direction of dragging (or flicking). Thus, with the still image playing screen 220, operation inputs by dragging can switch to zooming scale adjusting or scrolling by long-pressing.

Further, with the still image playing screen 220, when an optional position on a still image is long-pressed, the mochi cursor Cs and zoom indicator Zi are displayed. Thus, information indicating that the operation input by dragging has been switched to zooming scale adjusting can be confirmed by the user.

On the other hand, let us say that the upper edge portion of the luminance-chroma palette 221 displayed on the lower edge of the still image playing screen 220 has been touched, and flicking (or dragging) in the upward direction of the screen is performed.

The CPU 110 pulls out the luminance-chroma palette 221 from the lower edge of the still image playing screen 220 in the upward direction, according to the flicking, as shown in FIG. 19A. The luminance-chroma palette 221 has the same horizontal width size as the horizontal width of the still image playing screen 220, and for example, is pulled out so as to cover the still image playing screen 220 from the lower edge thereof to the upper edge (i.e. the entire screen).

Further, the luminance-chroma palette 221 is divided in two, to a left side region 221L used when adjusting the luminance and a right side region 221R used when adjusting the chroma. Note that the left side region 221L is also called the luminance setting region, and the right side region 221R is also called the chroma setting region.

Further, the luminance setting region 221L and chroma setting region 221R are transparent except for the frame portions thereof, whereby the still image displayed on the still image playing screen 220 can be seen through these regions. Also, the characters "luminance" are displayed on the luminance setting region 221L, and the characters "chroma" are displayed on the chroma setting region 221R.

With the luminance-chroma palette 221, the luminance of the still image can be adjusted by dragging in the vertical direction, having within the luminance setting region 221L as the starting point, and the chroma of the still image can be adjusted by dragging in the vertical direction, having within the chroma setting region 221R as the starting point.

Let us say that the luminance setting region 221L is touched and dragging is performed in the vertical direction of the screen, as shown in FIGS. 19B and 19C. The CPU 110 displays the mochi cursor Cs stretching in the vertical direction from the dragging starting point to the ending point on the screen.

Now, upon confirming that the direction of the displayed mochi cursor Cs is in the vertical direction, the CPU 110 controls the adjustment speed of the displayed still image luminance (values of the adjustment direction and adjustment speed), according to the direction and length of the mochi cursor at this time.

Specifically, if the direction of the displayed mochi cursor Cs is upward-facing, the CPU 110 sets the luminance adjustment direction as the direction of increasing luminance. On the other hand, if the direction of the displayed mochi cursor Cs is downward-facing, the CPU 110 sets the luminance adjustment direction as the direction of decreasing luminance. Further, the value of the luminance adjustment speed is set to a greater value as the length of the mochi cursor Cs is lengthened.

Consequently, for example, if the mochi cursor Cs is stretched up a long ways by dragging in the upper direction of the screen, the luminance of the displayed still image is increased all at once.

Also, for example, if the mochi cursor Cs is stretched down a short ways by dragging in the lower direction of the screen, the luminance of the displayed still image is decreased slowly.

Further, if after such dragging in the vertical direction of the screen, the finger is not released from the touch screen 102 and is not moved, the mochi cursor Cs continues to be displayed without change to the direction and length thereof, and the adjustment speed (values of adjustment direction and adjustment speed) is maintained.

Conversely, let us say that the chroma setting region 221R is touched, and dragging performed in the vertical direction of the screen, as shown in FIGS. 19D and 19E. The CPU 110 displays on the screen the mochi cursor Cs that is stretched from the dragging starting point to the ending point.

Now, upon confirming that the direction of the displayed mochi cursor Cs is vertically-facing, the CPU 110 controls the chroma adjustment speed of the displayed still image, according to the direction and length of the mochi cursor Cs at this time.

Specifically, if the direction of the displayed mochi cursor Cs is upward-facing, the CPU 110 sets the chroma adjustment direction to the direction of increasing chroma. On the other hand, if the direction of the displayed mochi cursor Cs is downward-facing, the CPU 110 sets the chroma adjustment direction as the direction of decreasing chroma. Further, the value of the chroma adjustment speed is set to a greater value as the length of the mochi cursor Cs is lengthened.

Consequently, for example, if the mochi cursor Cs is stretched up a long ways by dragging in the upper direction of the screen, the chroma of the displayed still image is increased all at once.

Also, for example, if the mochi cursor Cs is stretched down a short ways by dragging in the lower direction of the screen, the chroma of the displayed still image is decreased slowly.

Further, if after such dragging in the vertical direction of the screen, the finger is not released from the touch screen 102 and is not moved, the mochi cursor Cs continues to be displayed without change to the direction and length thereof, and the adjustment speed (values of adjustment direction and adjustment speed) is maintained.

Thus, with the luminance-chroma palette 221 herein, the luminance and chroma can be adjusted at a desired adjustment speed with the operation inputs from the mochi cursor Cs, while showing the user the dragging starting point-ending point direction and starting point-ending point distance with the mochi cursor Cs.

Also, the luminance-chroma palette 221 is transparent except for the frame portions thereof, whereby the still images displayed below the luminance-chroma palette 221 can be viewed while adjusting the luminance and chroma.

Subsequently, upon the dragging ending, the CPU 110 brings the ending point side of the mochi cursor Cs close to the starting point side and shrinks into a circle the mochi cursor Cs that has been stretched vertically, then deletes the mochi cursor Cs from the screen, and ends the luminance or chroma adjustment. Hereafter, the luminance or chroma immediately preceding the dragging is maintained.

As described above, with the still image playing application, when an optional position on a still image displayed on the still image playing screen 220 is long-pressed, the circular mochi cursor Cs is displayed at the long-pressed position. Also, at this time the still image playing application switches the operation input by dragging from scrolling the still image to zooming scale adjusting.

With the still image playing application, upon dragging in the vertical direction being performed, the mochi cursor Cs displayed accordingly thereto is stretched in the vertical direction, and the zooming scale of the still image is adjusted according to the dragging herein.

Also, with the still image playing application, upon dragging (or flicking) being performed without long-pressing, the still image displayed on the still image playing screen 220 is scrolled according to the dragging.

Thus, with the still image playing application, operation inputs by dragging can be switched by long-pressing to zooming scale adjusting or scrolling, and zooming scale adjusting and still image scrolling can be performed just with dragging.

Also, with the still image playing application, upon dragging in the vertical direction being performed on the luminance-chroma palette 221, a vertically-facing mochi cursor Cs is displayed according thereto.

Now, with the still image playing application, if the dragging starting point is within the luminance region 221L of the luminance-chroma palette 221, the values of adjustment direction and adjustment speed of the still image luminance is set according to the direction and length of the mochi cursor Cs.

On the other hand, with the still image playing application, if the dragging starting point is within the chroma region 221R of the luminance-chroma palette 221, the values of adjustment direction and adjustment speed of the still image chroma is set according to the direction and length of the mochi cursor Cs.

Thus, with the still image playing application, the operation inputs by dragging can be switched to luminance adjusting or chroma adjusting of the still image, based on the dragging starting position on the luminance-chroma palette 221.

Additionally, with the still image playing application, the luminance and chroma of the still image can be adjusted while freely changing the values of the adjustment direction and adjustment speed, with only the operation inputs from the mochi cursor Cs that accompanies the dragging in the vertical direction.

As described up to this point, the portable terminal 100 can readily perform playing of moving pictures, switching of display content, scrolling through various lists, and adjustments of various parameters and so forth with only the operation inputs from the mochi cursor Cs that accompanies the dragging.

2-4. Operation Input Processing Procedures

Next, procedures of specific processing that the portable terminal 100 executes according to the operation inputs by the mochi cursor Cs (this is called an operation input processing procedure) will be described.

2-4-1. Operation Input Processing Procedures with Moving Picture Playing Application First, the operation input processing procedures in the case of performing chapter playing, chapter and chapter list switching, and chapter list scrolling with the moving picture playing application will be described with reference to the flowchart shown in FIG. 20.

Note that an operation input processing procedure RT1 shown in FIG. 20 is the procedure for processing to be executed by the CPU 110 of the portable terminal 100 according to the program for the moving picture playing application stored in the nonvolatile memory 111.

The CPU 110 starts up the moving picture playing application, and upon one of the thumbnails of the moving pictures displayed in a list being tapped, starts the operation input processing procedure RT1, and moves to step SP1. In step SP1 the CPU 110 determines whether or not there is a touch operation as to the touch panel 102B, based on input signals from the touch panel 102B.

Upon obtaining a negative result here, the CPU 110 moves to step SP2, plays the moving picture corresponding to the tapped thumbnail at 1× speed in the forward direction (i.e. plays normally), and returns again to step SP1.

Conversely, upon obtaining a positive result in step SP1, the CPU 110 moves to step SP3. In step SP3 the CPU 110 displays the mochi cursor Cs as appropriate according to the touch operation at this time, and determines whether or not the touch operation is a dragging in the horizontal direction of the screen.

Upon obtaining a negative result here, the CPU 110 returns to step SP1 again. Conversely, upon obtaining a positive result in step SP3, the CPU moves to step SP4.

In step SP4 the CPU 110 determines whether or not the current display content is a chapter. Upon obtaining a positive result in step SP4, the CPU 110 moves to step SP5.

In step SP5 the CPU 110 determines whether or not the ending point of the displayed mochi cursor Cs (i.e. the dragging ending point) is within the left edge region 200A or the right edge region 200C.

If a negative result is obtained here, this means that the current display content is a chapter, and that the ending point of the displayed mochi cursor Cs is outside of the left edge region 200A or outside of the right edge region 200C (i.e. is within the center region 200B).

The CPU 110 at this time moves to step SP6, controls the chapter playing speed according to the direction and length of the displayed mochi cursor Cs, and returns again to step SP1.

Conversely, if a positive result is obtained in step SP5, this means that the current display content is a chapter, and that the ending point of the displayed mochi cursor Cs is within the left edge region 200A or the right edge region 200C (i.e. is outside of the center region 200B).

The CPU 110 at this time moves to step SP7, transfers the display content from the chapter to the chapter list which is upper level information, and returns again to step SP1.

On the other hand, if a negative result is obtained in step SP4, this means that the current display content is a chapter list.

The CPU 110 at this time moves to step SP8, controls the chapter list scrolling speed according to the displayed mochi cursor Cs, and returns again to step SP1.

Following such operation input processing procedure RT1, the CPU 110 performs chapter playing, chapter and chapter list switching, and chapter list scrolling, according to the operation input from the mochi cursor Cs accompanying the dragging.

Next, the operation input processing procedures in the case of performing volume adjusting with the moving picture playing application will be described with reference to the flowchart shown in FIG. 21.

Figure 21:
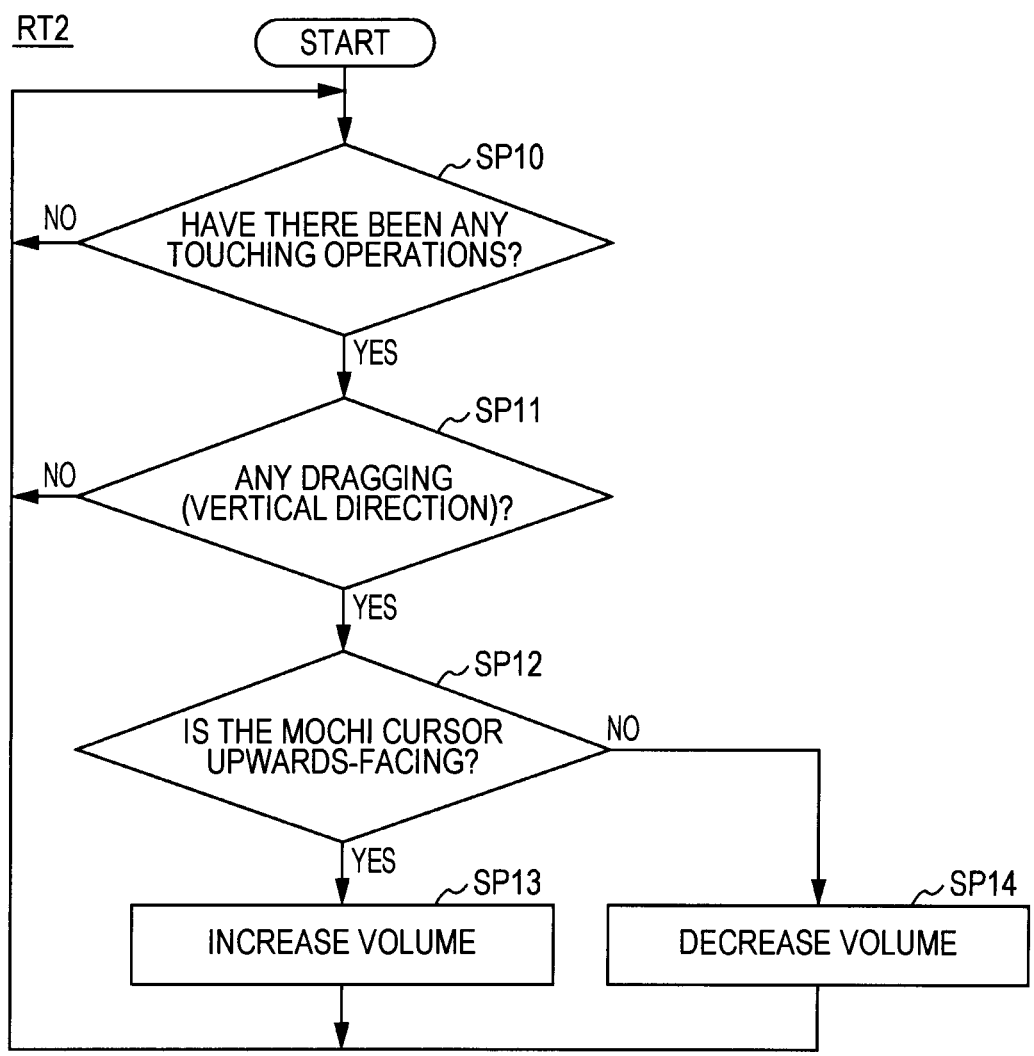
FIG. 21 is a flowchart describing second operation input processing procedures.

Note that an operation input processing procedure RT2 shown in FIG. 21 is also a procedure for processing to be executed by the CPU 110 of the portable terminal 100 according to the program for the moving picture playing application stored in the nonvolatile memory 111.

The CPU 110 starts up the moving picture playing application, and upon one of the thumbnails of the moving pictures displayed in a list being tapped, starts the operation input processing procedure RT2, and moves to step SP10. In step SP10 the CPU 110 determines whether or not there is a touch operation as to the touch panel 102B, based on input signals from the touch panel 102B.

In step SP10 the CPU 110 waits until a positive result is obtained, and upon obtaining a positive result, moves to step SP11.

In step SP11 the CPU 110 displays the mochi cursor Cs according to the touch operation at this time, and determines whether or not the touch operation at this time is a dragging in the vertical direction of the screen.

Upon obtaining a negative result in step SP11, the CPU 110 returns again to step SP10. Conversely, upon obtaining a positive result in step SP11, the CPU 110 moves to step SP12.

In step SP12 the CPU determines whether or not the currently displayed mochi cursor Cs is upward-facing (i.e. if the dragging ending point is farther upward than the starting point).

If a positive result is obtained in step SP12, this means that the direction of the mochi cursor Cs is upward-facing (i.e. if the dragging ending point is farther upward than the starting point).

The CPU 110 at this time moves to step SP13, increases the volume with the adjustment speed according to the direction (upward-facing) and length of the mochi cursor Cs displayed at this time, and returns again to step SP10.

Conversely, if a negative result is obtained in step SP12, this means that the direction of the mochi cursor Cs is downward-facing (i.e. if the dragging ending point is lower than the starting point).

The CPU 110 at this time moves to step SP14, decreases the volume with the adjustment speed according to the direction (downward-facing) and length of the mochi cursor Cs displayed at this time, and returns again to step SP10.

Following such operation input processing procedure RT2, the CPU 110 performs volume adjustments, according to the operation input from the mochi cursor Cs accompanying the dragging.

2-4-2. Operation Input Processing Procedures with Tune Playing Application

Next, the operation input processing procedures in the case of performing track list and album list switching and album list scrolling with the tune playing application will be described with reference to the flowchart shown in FIG. 22.

Figure 22:
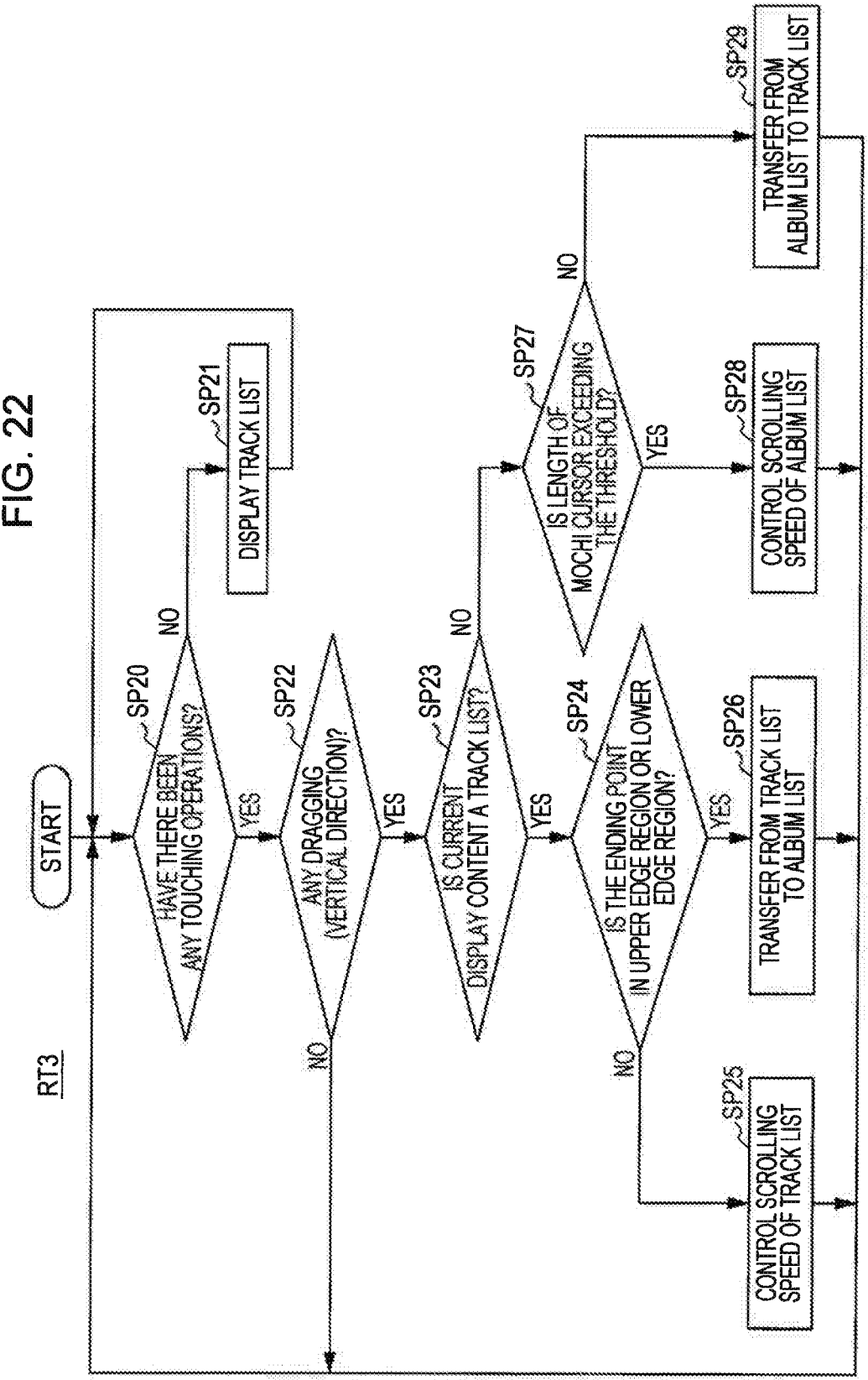
FIG. 22 is a flowchart describing operation input processing procedures (3)

Note that an operation input processing procedure RT3 shown in FIG. 22 is a procedure for the CPU 110 of the portable terminal 100 to execute according to a program of the tune playing application stored in the nonvolatile memory 111.

Upon starting the tune playing application, the CPU 110 starts the operation input processing procedure RT3, and moves to step SP20. In step SP20 the CPU 110 determines whether or not there is any touch operation as to the touch panel 102B, based on input signals from the touch panel 102B.

Upon obtaining a negative result in step SP20, the CPU 110 moves to step SP21, displays the track list on the track selection screen 210, and returns again to step SP20.

Conversely, upon obtaining a positive result in step SP20, the CPU 110 moves to step SP22. In step SP22 the CPU 110 displays the mochi cursor Cs in accordance with the touch operation at this time, and determines whether or not the touch operation at this time is a dragging in the vertical direction of the screen.

Upon obtaining a negative result in step SP22, the CPU 110 returns again to step SP20. Conversely, upon obtaining a positive result in step SP22, the CPU 110 moves to step SP23.

In step SP23 the CPU 110 determines whether or not the current display content is a track list. Upon obtaining a positive result in step SP23, the CPU 110 moves to step SP24.

In step SP24 the CPU 110 determines whether or not the ending point of the displayed mochi cursor Cs (i.e. the dragging ending point) is within the upper edge region 210A or lower edge region 210C.

If a negative result is obtained in step SP24, this means that the current display content is a track list, and that the ending point of the mochi cursor Cs is in neither the upper edge region 210A nor lower edge region 210C, but is in the center region 210B.

The CPU 110 at this time moves to step SP25, controls the track list scrolling speed according to the direction and length of the mochi cursor Cs, and returns again to step SP20.

Conversely, if a positive result is obtained in step SP24, this means that the current display content is a track list, and that the ending point of the mochi cursor Cs is within the upper edge region 210A or lower edge region 201C (i.e. outside the center region 210B).

The CPU 110 at this time moves to step SP26, transfers the display content from the track list to the album list which is upper level information, and returns again to step SP20.

On the other hand, if a negative result is obtained in step SP23, this means that the current display content is an album list.

At this time the CPU 110 moves to step SP27, and determines whether or not the length of the displayed mochi cursor Cs exceeds a predetermined threshold.

If a positive result is obtained in step SP27, this means that the current display content is an album list, and that the length of the mochi cursor Cs exceeds a predetermined threshold.

At this time, the CPU 110 moves to step SP28, controls the album list scrolling speed according to the direction and length of the mochi cursor Cs, and returns again to step SP20.

Conversely, if a negative result is obtained in step SP27, this means that the current display content is an album list, and that the length of the mochi cursor Cs is at or below a predetermined threshold.

The CPU 110 moves to step SP29, transfers the display content from the album list to the track list which is lower level information, and returns again to step SP20.

Following such operation input processing procedure RT3, the CPU 110 performs switching of display content, and scrolling of track lists and album lists, according to the operation input from the mochi cursor Cs accompanying the dragging.

2-4-3. Operation Input Processing Procedures with Still Image Playing Application Next, the operation input processing procedures in the case of performing adjustments of the zooming scale which is a still image parameter with the still image playing application will be described with reference to the flowchart shown in FIG. 23.

Figure 23:
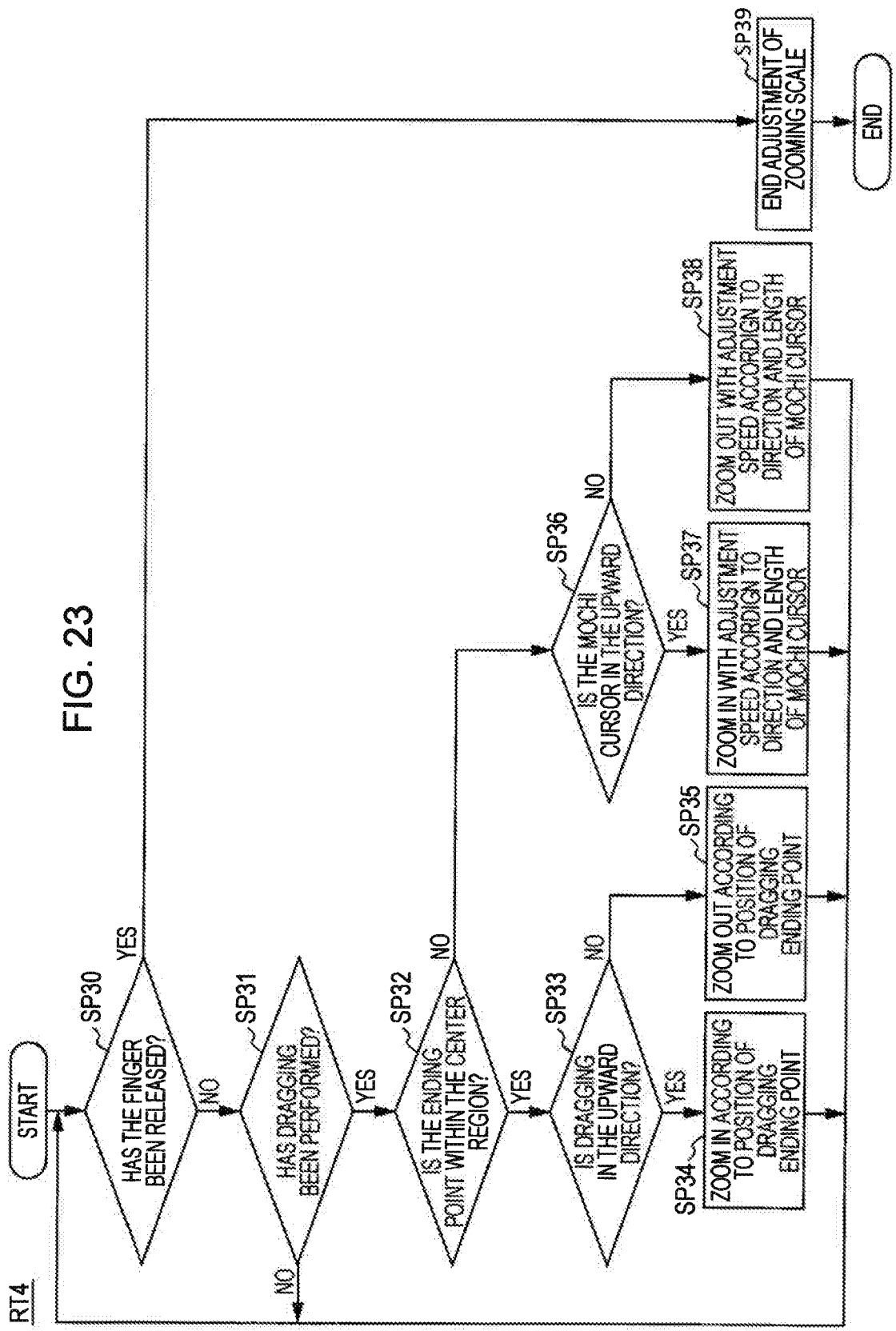
FIG. 23 is a flowchart describing operation input processing procedures (4)

Note that an operation input processing procedure RT4 shown in FIG. 23 is a procedure for the CPU 110 of the portable terminal 100 to execute according to a program of the still image playing application stored in the nonvolatile memory 111.

Upon starting the still image playing application, while the still image playing screen 220 is displayed if an optional position on the displayed still image is long-pressed, the CPU 110 displays the mochi cursor Cs, starts the operation input processing procedure RT4, and moves to step SP30.

In step SP30 the CPU 110 determines whether or not a finger has been released, based on input signals from the touch panel 102B.

If a negative result is obtained in step SP30, this means that after the long-pressing, the finger is continuing to be touching.

At this time the CPU 110 moves to step SP31, and determines whether or not dragging in the vertical direction has been performed, based on input signals from the touch panel 102B.

Upon obtaining a negative result in step SP31, the CPU 110 returns again to step SP30. Conversely, upon obtaining a positive result in step SP31, the CPU 110 expands and shrinks in the vertical direction the mochi cursor Cs displayed according to the dragging in the vertical direction, and moves to step SP32.

In step SP32 the CPU 110 determines whether or not the ending point of the displayed mochi cursor Cs (i.e. the dragging ending point) is within the center region 220B.

If a positive result is obtained in step SP32, this means that the ending point of the mochi cursor Cs (i.e. the dragging ending point) is within the center region 220B.

At this time the CPU 110 moves to the step SP33, and determines whether or not the direction of the dragging performed at this time is in the upward direction.

If a positive result is obtained in step SP33, this means that the dragging direction performed at this time is in the upward direction.

At this time the CPU 110 moves to step SP34, increases the zooming scale of the still image (zooms in) according to the position of the dragging ending point, and returns again to step SP30.

Conversely, if a negative result is obtained in step SP33, this means that the direction of dragging performed at this time is in the downward direction.

At this time the CPU 110 moves to step SP35, decreases the zooming scale of the still image (zooms out), and returns again to step SP30.

On the other hand, if a negative result is obtained in step SP32, this means that the ending point of the displayed mochi cursor Cs (i.e. the dragging ending point) is outside of the center region 220B.

At this time the CPU 110 moves to step SP36, and determines whether or not the direction of the displayed mochi cursor Cs is upward facing (i.e. if the dragging ending point is farther upward than the starting point).

If a positive result is obtained in step SP36, this means that the direction of the mochi cursor Cs is upward facing (i.e. the dragging ending point is farther upward than the starting point).

At this time the CPU 110 moves to step SP37, increases the zooming scale of the still image (zooms in) at an adjustment speed according to the direction (upward-facing) and length of the displayed mochi cursor Cs.

Conversely, if a negative result is obtained in step SP36, this means that the direction of the mochi cursor Cs is downward-facing (i.e. the dragging ending point is lower than the starting point).

At this time the CPU 110 moves to step SP38, decreases the zooming scale of the still image (zooms out) at an adjustment speed according to the direction (downward-facing) and length of the displayed mochi cursor Cs, and returns again to step SP30.

On the other hand, if a positive result is obtained in step SP30, this means that the dragging has ended.

At this time the CPU 110 moves to step SP39, ends the adjustments of the still image zooming scale, deletes the mochi cursor Cs from the screen, and ends the operation input processing procedure RT4.

Following such an operation input processing procedure RT4, the CPU 110 performs adjustments of the zooming scale which is a still image parameter, according to operation inputs from the mochi cursor Cs which accompanies the dragging.

Next, the operation input processing procedures in the case of performing adjustments to the luminance and chroma with the still image playing application will be described with reference to the flowchart shown in FIG. 24.

Figure 24:
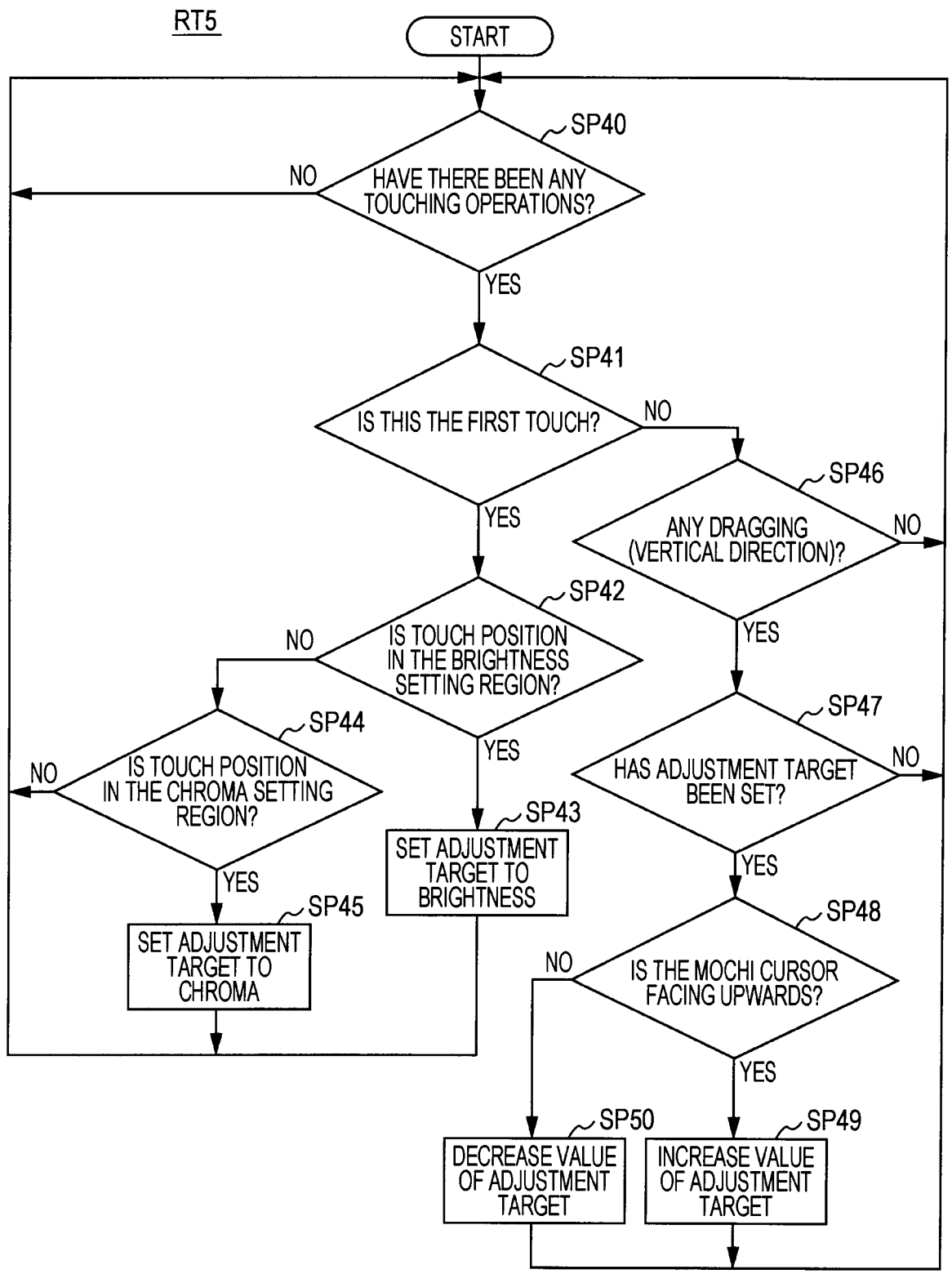
FIG. 24 is a flowchart describing operation input processing procedures (5)

Note that an operation input processing procedure RT5 shown in FIG. 24 is also a procedure for the CPU 110 of the portable terminal 100 to execute according to a program of the still image playing application stored in the nonvolatile memory 111.

Upon pulling out and displaying the luminance-chroma palette 221 onto the still image playing screen 220, the CPU 110 starts the operation input processing procedure RT5, and moves to step SP40. In step SP40 the CPU 110 determines whether or not there is any touch operation as to the touch panel 102B, based on input signals from the touch panel 102B.

In step SP40, the CPU 110 awaits until a positive result is obtained, and upon obtaining a positive result, moves to step SP41.

In step SP41 the CPU 110 determines whether or not the touch operation at this time is the first touch operation. Note that a first touch is a touch at a position first touched within a series of touch operations when a finger touches until released.

Upon obtaining a negative result in step SP41, the CPU 110 at this time returns again to step SP40. Conversely, upon obtaining a positive result in step SP41, the CPU 110 at this time moves to step SP42.

In step SP42 the CPU 110 determines whether or not the position first touched is within the luminance setting region 221L.

If a positive result is obtained in step SP42, this means that the position first touched is within the luminance setting region 221L. At this time the CPU 110 moves to step SP43.

In step SP43 the CPU 110 displays the mochi cursor Cs at the touched position, sets the adjustment target to luminance, and returns again to step SP40.

Conversely, if a negative result is obtained in step SP42, this means that the position first touched is not within the luminance setting region 221L.

At this time the CPU 110 moves to step SP44, and determines whether or not the position first touched is within the chroma setting region 221R.

If a negative result is obtained in step SP44, this means that the position first touched is not in the luminance setting region 221L or the chroma setting region 221R. At this time the CPU 110 returns again to step SP40.

Conversely, if a positive result is obtained in step SP44, this means that the position first touched is within the chroma setting region 221R. At this time the CPU 110 moves to step SP45.

In step SP45 the CPU 110 displays the mochi cursor Cs at the touched position, sets the adjustment target to chroma, and returns again to step SP40.

On the other hand, if a negative result is obtained in step SP41, this means that the touch operation at this time is not the first touch.

At this time the CPU 110 moves to step SP46, and determines whether or not the touching operation at this time is a dragging in the vertical direction.

If a negative result is obtained in step SP46, this means that the touch operation at this time is not a first touch or a dragging. At this time the CPU 110 returns again to step SP40.

Conversely, if a positive result is obtained in step SP46, this means that the touch operation at this time is a vertically facing dragging. The CPU 110 at this time moves to step SP47.

In step SP47 the CPU 110 determines whether or not the adjustment target has already been set.

If a negative result is obtained in step SP47, this means that the adjustment target has not yet been set, i.e. that the dragging currently performed is a dragging from the touch performed outside of the luminance setting region 221L and chroma setting region 221R. At this time the CPU 110 returns again to step SP40.

Conversely, if a negative result is obtained in step SP47, this means that the adjustment target has been set, i.e. that the dragging currently performed is a dragging from the touch performed within the luminance setting region 221L or chroma setting region 221R.

At this time the CPU 110 moves to step SP48, and determines whether or not the direction of the displayed mochi cursor Cs is upward facing (i.e. whether the dragging ending point is further upward than the starting point).

If a negative result is obtained in step SP48, this means that the direction of the displayed mochi cursor Cs is upward facing (i.e. the dragging ending point is further upward than the starting point).

At this time the CPU 110 moves to step SP49, increases the value of the adjustment target (luminance or chroma) at an adjustment speed according to the direction (upward-facing) and length of the displayed mochi cursor Cs, and returns again to step SP40.

Conversely, if a negative result is obtained in step SP48, this means that the direction of the displayed mochi cursor Cs is downward facing (i.e. the dragging ending point is lower than the starting point).

At this time the CPU 110 moves to step SP50, decreases the value of the adjustment target (luminance or chroma) at an adjustment speed according to the direction (downward-facing) and length of the displayed mochi cursor Cs, and returns again to step SP40.

Following such an operation input processing procedure RT5, the CPU 110 performs adjustments of luminance or chroma which are still image parameters, according to operation inputs from the mochi cursor Cs which accompanies the dragging.

2-5. Operations and Advantages of First Embodiment

According to the above configurations, with a still image playing application, if an optional position on a displayed still image is long-pressed, the portable terminal 100 displays a circular mochi cursor Cs at the long-pressed position.

At this time the portable terminal 100 switches the operation input by the dragging from the still image scrolling to the zooming scale adjusting, and sets the center region 220B having the position first long-pressed (i.e. the dragging starting point) as the center thereof in the vertical direction.

Upon dragging being performed in the vertical direction, the portable terminal 100 stretches out the mochi cursor Cs displayed accordingly in the vertical direction.

If the ending point of the mochi cursor Cs (dragging ending point) is within the center region 220B, the portable terminal 100 increases/decreases the zooming scale by an amount equivalent to the amount of dragging.

On the other hand, if the ending point of the mochi cursor Cs is outside of the center region 220B, the portable terminal 100 sets the adjustment speed of the zooming scale (increase/decrease speed) according to the direction and length of the mochi cursor Cs (dragging starting point-ending point direction and starting point-ending point distance), and continues to increase/decrease the zooming scale at the set adjustment speed.

Thus, the portable terminal 100 switches between whether to increase/decrease the zooming scale by an amount equivalent to the amount of dragging or whether to set the zooming scale increase/decrease speed according to the dragging and continue increasing/decreasing the zooming scale, according to whether or not the dragging ending point is within a predetermined range from the starting point (within the center region 220B).

Thus, if the zooming scale is increased/decreased by an amount equivalent to the amount of dragging, the portable terminal 100 can enable the user to readily adjust the zooming scale. Also, if the zooming scale adjustment speed is set according to the dragging and the zooming scale is continuously increased/decreased, the portable terminal 100 can enable the user to adjust the zooming scale without limiting the adjustment range of the zooming scale to dragging one time.

The portable terminal 100 can enable a user to perform such switching by inserting or removing the dragging ending point in a predetermined range (center region 220), thereby enabling performing this within dragging which is an operation to adjust the zooming scale.

Accordingly, the portable terminal 100 can enable a user to readily adjust the zooming scale without limiting the zooming scale adjustment range to dragging one time.

Also, when the dragging ending point is within the center region 220B, the portable terminal 100 increases/decreases the zooming scale by an amount equivalent to the amount of dragging, and when the dragging ending point is outside of the center region 220B, the increase/decrease speed of the zooming scale is set and the zooming scale continuously increased/decreased according to the dragging.

Thus, when the length of the mochi cursor Cs is short, the zooming scale can be finely adjusted, and when the length of the mochi cursor Cs is long, the zooming scale can be widely changed, whereby the portable terminal 100 can enable the user to perform operations intuitively.

According to the above configurations, the portable terminal 100 can enable the user to readily adjust values without limiting the zooming scale adjustment range to dragging one time. That is to say, the portable terminal 100 can enable the user to readily adjust the zooming scale to a desired zooming scale without performing dragging multiple times, and also can further improve operability as compared to the related art while performing operation input by dragging.

3. Second Embodiment

Next, a second embodiment will be described. According to the second embodiment, an application that displays a map (also called map display application) is installed on the portable terminal 100 as an application corresponding to operation input from the mochi cursor Cs.

Note that the hardware configuration of the portable terminal 100 and the basic operations of the operation input from the mochi cursor Cs are similar to the first embodiment, so the first embodiment should be referenced. Therefore, just the operation inputs from the mochi cursor Cs with the map display application will be described here.

3-1. Operation Input Example with Map Display Application

In a state wherein icons corresponding to a map display application startup are displayed on the touch screen 102, the user has tapped an icon, the CPU 110 of the portable terminal 100 accepts the touch operation as operation input that starts the map display application.

Figure 25:
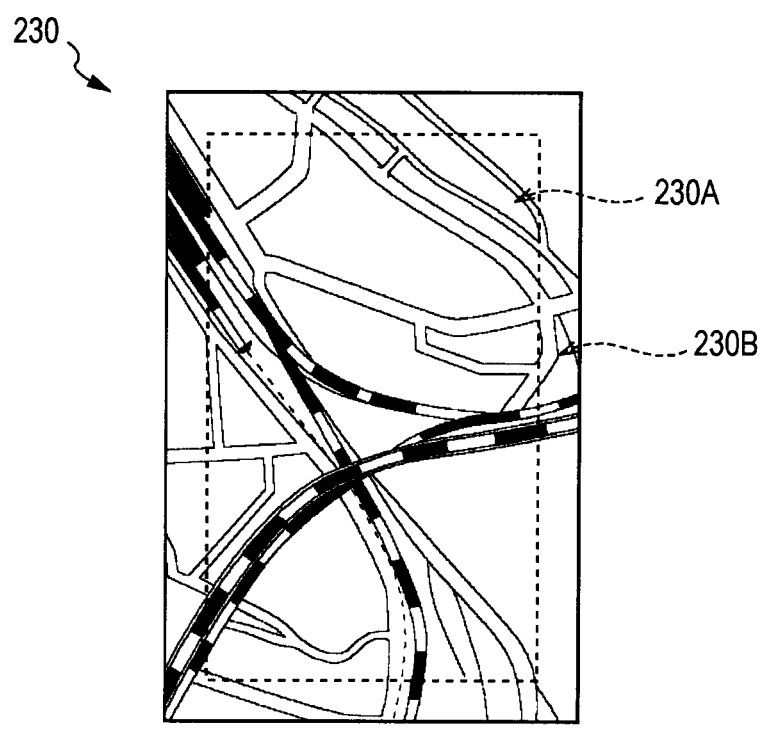
FIG. 25 is schematic diagram illustrating a configuration of a map screen.

The CPU 110 reads out and executes the program for the map display application from the nonvolatile memory 111, thereby starting the map display application. Upon starting the map display application, the CPU 110 displays the map screen 230 shown in FIG. 25 on the touch screen 102. Note that the map screen 230 is a vertical screen, assumes vertical use, and is displayed on a full screen of a vertical touch screen 102.

The map screen 230 is divided into two parts, a center region 230A made up of a rectangular region having the center of the screen as the center thereof, and an outer side region 230B made up of a region that surrounds the outer side of the center region 230A. The vertical and horizontal lengths of the center region 230A are approximately 80% of the length of the vertical and horizontal lengths of the screen, for example. A frame Fr1 (FIG. 26A) showing the center region 230A is displayed on the map screen 230.

Also, the CPU 110 reads out map information data of an optional geographic region (e.g. a geographic region set by the user beforehand) from the nonvolatile memory 110, and displays the map image on the map screen 230, based on the map information data. Note that at least a portion of the map image is displayed on the map screen 230.

With the map screen 230, scrolling of the map image can be controlled by dragging. Let us say that dragging in the upper right direction of the screen is performed, as shown in FIG. 26A. The CPU 110 then determines whether the dragging ending point is within the center region 230A.

Now, if the dragging ending point is within the center region 230A, the CPU 110 sets the scrolling mode to normal scrolling mode, and controls the scrolling of the map image according to the direction and length of the dragging. That is to say, the CPU 110 performs general scrolling control by dragging.

Specifically, the CPU 110 scrolls the map image in the same direction as the dragging direction, in an amount according to the length of the dragging. In FIG. 26A, the dragging direction is the upper right direction of the screen, whereby the CPU 110 scrolls the map image in the upper right direction of the screen by an amount equivalent to the amount according to the dragging length.

Also, let us say that the dragging is continued and the dragging ending point has exited the center region 230A (i.e. is within the outer side region 230B), as shown in FIG. 26B.

The CPU 110 then transfers the scrolling mode to mochi scrolling mode, deletes the frame Fr1 from the screen, and displays the mochi cursor Cs which stretches from the dragging starting point to the ending point on the screen. Note that the mochi cursor Cs is displayed until the finger is released from the touch screen 102 and the dragging is ended.

Upon displaying the mochi cursor Cs, the CPU 110 controls the scrolling of the map image according to the direction and length of the mochi cursor Cs. Specifically, the CPU 110 sets the same direction as the direction of the displayed mochi cursor Cs as the map image scrolling direction. Further, the longer the length of the mochi cursor Cs at this time is, the greater a value the scrolling speed is set to.

Consequently, as shown in FIG. 26B, if the mochi cursor Cs is stretched a long ways in the upper right by dragging in the upper right direction of the screen, the map image displayed on the map screen 230 is scrolled in the upper right direction at a high speed.

After such dragging, if the finger is not released from the touch screen 102 and not moved, the mochi cursor Cs continues to be displayed without change the direction and length thereof, and the scrolling speed (values of scrolling direction and scrolling speed) at this time is maintained.

Further, after such dragging, let us say that the finger is not released and the dragging is continued, and as shown in FIG. 26C the ending point of the mochi cursor Cs (i.e. the dragging ending point) returns to within the center region 230A from outside of the center region 230A.

In this case, the CPU 110 continues the mochi scrolling mode, and continues to control the scrolling speed of the map image according to the direction and length of the mochi cursor Cs. That is to say, once transferred to the mochi scrolling mode, the CPU 110 continues the mochi scrolling mode until the finger is released and dragging is ended, regardless of the position of the dragging ending point.

Subsequently, upon the dragging being ended, the CPU 110 ends the map image scrolling, and upon shrinking the stretched mochi cursor Cs down to a circle, deletes the mochi cursor Cs from the screen, and displays the frame Fr1 again.

Thus, with the map display application, when dragging is performed, normal scrolling mode is used until the dragging ending point moves outside of the center region 230A, and performs general scrolling control by dragging.

On the other hand, with the map display application, if the dragging ending point moves outside of the center region 230A, transition is made to the mochi scrolling mode, and the values of the scrolling direction and scrolling speed of the map image are control according to the direction and length of the mochi cursor Cs.

Thus, with the map display application, general scrolling control by dragging can be transferred to scrolling speed control by the mochi cursor Cs, by enabling the user to perform a simple operation such as moving the dragging ending point outside of the center region 230A.

Accordingly, the user can readily select general scrolling control by dragging or scrolling speed control by the mochi cursor Cs, just by dragging.

4. Other Embodiments 4-1. Other Embodiment 1

Note that according to the first embodiment described above, with a moving picture playing application, control of chapter playing speed, switching of chapter and chapter list (switching of layers), and control of volume adjusting speed are performed by operation inputs from the mochi cursor Cs.

Control of playing speed of various contents, switching of layers, and control of adjusting speed of various parameters may be performed by operation inputs from the mochi cursor Cs, with applications other than this.

For example, with a tune playing application, control of the tune (track) playing speed may be performed by operation inputs from the mochi cursor Cs.

In this case, for example, upon a track being selected from a track list, the CPU 110 displays the track related information (track title, jacket image, etc) on the screen, and normally plays the track.

Subsequently, upon dragging in the horizontal direction of the screen being performed, the CPU 110 displays a horizontal-facing mochi cursor Cs according to the dragging, and sets the values of track playing direction and playing speed, according to the direction (left or right) and length of the mochi cursor Cs.

Also, at this time, if the ending point of the mochi cursor Cs enters a predetermined region provided on the left and right edges of the screen, the display content on the screen may be transferred to the upper level track list from the track related information, and the layer can be switched.

Thus, with the tune playing application, similar to the moving picture playing application, control of the music (track) playing speed, and switching from the track related information to an upper level track list, can be performed.

Also, according to the first embodiment described above, with the tune playing application, the scrolling speed of the track list is controlled by operation inputs from the mochi cursor Cs.

Control of scrolling speed of various display items (images, text, lists, etc.) may be performed by operation inputs from the mochi cursor Cs, with applications other than this. For example, the scrolling speed of a page image may be controlled by operation inputs from the mochi cursor Cs using a Web browser.

In this case, if dragging is performed in the vertical direction of the screen in a state wherein a page image is displayed on a Web browser screen, the CPU 110 displays a vertical-facing mochi cursor Cs according to the dragging herein. The CPU 110 then sets the values for the scrolling direction and scrolling speed of the page image, according to the direction (up or down) and length of the mochi cursor Cs.

Note that the scrolling direction is not limited to a one-dimensional direction (vertical direction or horizontal direction), and scrolling can be performed in two-dimensional directions for display items such as maps, photographs, enlarged documents and so forth, which expand in the entirety thereof in the up/down/left/right directions as to the displayed range.

Now, there may be cases wherein scrolling intermittently in certain increments may be easier to visually confirm rather than controlling the scrolling speed and scrolling continuously, depending on the display item. For example, in the case of scrolling a thumbnail list, intermittent scrolling, whereby one thumbnail is displayed and several seconds pass before the thumbnail is scrolled and the next thumbnail is displayed, improves visual confirmation of each thumbnail.

In this case, the value of the scrolling speed is not set, but rather, the waiting time between scrolling and scrolling should be set, according to the length of the mochi cursor Cs.

Thus, the scrolling direction and waiting time of intermittent scrolling can be controlled with the direction and length of the mochi cursor Cs.

Note that whether to perform continuous scrolling or whether to perform intermittent scrolling can be set by the user, or the CPU 110 can set this automatically based on the setting information that is set for each display item.

Now, as other examples wherein intermittent scrolling is effective, for example there are cases wherein the display item is a document or the display item is a document and a chart, for example. In the case that the display item is a document, intermittent scrolling can be performed in increments of rows, increments of sentences, or increments of pages including a searched character string, for example. Also, in the case that the display item is a document and a chart, intermittent scrolling can be performed in increments of pages including a chart, for example.

Further, not only with applications, but also with an OS or the like or various types of software, control of scrolling speeds of a display item, switching of layers, control of adjustment speeds of various parameters, and control of waiting time can be performed by operation inputs from the mochi cursor Cs. Note that OS is an abbreviation for Operating System.

For example, with an OS, the scrolling speed of a folder list or file list may be controlled by operation inputs from the mochi cursor Cs. Also, layers can be switched from file to folder. Further, the adjustment speed of screen resolution may be controlled, for example. Further, the waiting time of a slide show of images may be controlled, for example.

4-2. Other Embodiment 2

Also, according to the first embodiment described above, whether to increase/decrease the zooming scale by an amount equivalent to the amount of dragging, according to whether or not the ending point of the mochi cursor Cs is within the center region 220B, or whether to set the adjustment speed of the zooming scale according to the direction and length of the mochi cursor Cs, is switched.

However, regardless of the position of the ending point of the mochi cursor Cs, the adjustment speed of the zooming scale of the still image can be continually set according to the direction and length of the mochi cursor Cs, and the zooming scale continuously increased/decreased at the set adjustment speed.

Also, according to the embodiment described above, the center of the still image playing screen 220 is the center of the zoom, but should not be limited thus, and setting may be performed wherein, upon an optional position on the still image being continuously touched for a predetermined amount of time (i.e., if long-pressed), the position herein is set as the center of the zoom.

Specifically, let us say that an optional position on the still image is long-pressed, as shown in FIG. 27A. The CPU 110 then displays a circular mochi cursor Cs at the position on the still image that has been long-pressed, with the position herein as the center thereof, and sets the position herein as the center of the zoom, as shown in FIG. 27B. Also, this position also becomes the starting point of the mochi cursor Cs.

Let us say that subsequently, dragging is performed in the vertical direction of the screen without releasing the long-pressing finger, as shown in FIG. 27C. The CPU 110 stretches the mochi cursor Cs from the starting point of the mochi cursor in the dragging direction, so that the length of the mochi cursor Cs is equal to the distance from the dragging starting point to the ending point, according to the dragging herein.

The CPU 110 controls the adjustment speed of the zooming scale (enlarging scale/reduction scale) of the still image, according to the direction and length of the mochi cursor Cs at this time.

Figure 28A:
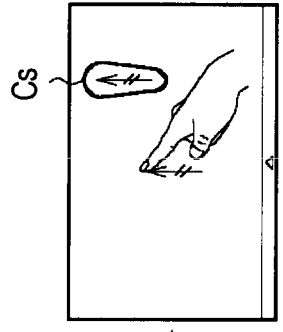
FIGS. 28A through 28C are schematic diagrams to accompany a description of a second operation input example by a mochi cursor with a still image playing application according to another embodiment.

Also, without being limited to this, if an optional position on the still image is tapped (touched and released), the position herein may be set as the center of the zoom, as shown in FIG. 28A.

Specifically, if an optional position on the still image is tapped, the CPU 110 displays a circular mochi cursor Cs on the tapped position, having the position herein as the center thereof, and sets this position as the center of the zoom. Also, this position becomes the starting point of the mochi cursor Cs.

Let us say that subsequently, the circular mochi cursor Cs is touched, and dragging is performed in the vertical direction of the screen. The CPU 110 stretches the mochi cursor Cs from the starting point of the mochi cursor in the dragging direction, so that the length of the mochi cursor Cs is equal to the distance from the dragging starting point to the ending point, according to the dragging herein.

The CPU 110 controls the adjustment speed of the zooming scale (enlarging scale/reduction scale) of the still image, according to the direction and length of the mochi cursor Cs at this time.

Also, in this case, the circular mochi cursor Cs is not necessarily touched, and even in a case wherein a portion other than the mochi cursor Cs is touched and dragged, the adjustment speed of the zooming scale can be controlled in the same way as in a case of touching and dragging.

Figure 28B:
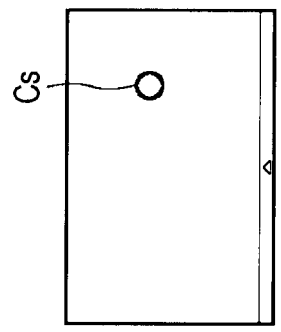
Figure 28C:
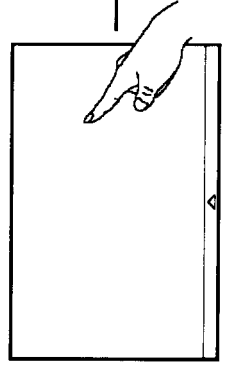

Let us say that, in a state wherein a circular mochi cursor Cs is displayed, a portion other than the mochi cursor Cs is touched and dragged in the vertical direction of the screen, as shown in FIGS. 28B and 28C. In this case, the CPU 110 stretches the mochi cursor Cs in a direction parallel to the direction of dragging from the starting point of the mochi cursor, so that the length of the mochi cursor Cs is equal to the distance from the dragging starting point to the ending point, according to the dragging herein. Consequently, the mochi cursor Cs is stretched in the same way as when the mochi cursor Cs is touched and dragged.

The CPU 110 controls the adjustment speed of the zooming scale (enlarging scale/reduction scale) of the still image, according to the direction and length of the mochi cursor Cs at this time. Consequently, the adjustment speed of the zooming scale becomes an adjustment speed similar to when the mochi cursor Cs is touched. By doing so, operability can be improved, even without dragging after touching the mochi cursor Cs. This is advantageous in the case wherein the touch screen 102 is small and the displayed mochi cursor Cs is small.

Subsequently, upon dragging being ended, the CPU 110 shrinks the mochi cursor Cs into a circle, and temporarily stops the zooming scale adjusting. Upon tapping being performed again, the CPU 110 deletes the mochi cursor Cs from the screen, resets the center of the zoom, and ends the adjustment of the zooming scale.

Note that the mochi cursor Cs may be displayed not only with tapping, but also according to double-tapping (tapping twice consecutively) and so forth or other various operations. Also, not only this, but the mochi cursor Cs may be displayed at a point in time wherein the CPU 110 has determined that the touch position has moved more than a predetermined threshold and the touch operation is a dragging operation. Also, the method of display of such a mochi cursor Cs may be modified according to the application.

4-3. Other Embodiment 3

Further, according to the first embodiment described above, for example with the tune playing application, the two information layers of track list and album list can be switched by operation inputs from the mochi cursor Cs. Not only this, but three or more layers of information may be switched by operation inputs from the mochi cursor Cs.

Now, for example, let us say that the tune file is managed with a hierarchical configuration of three layers, of an artist name as the highest layer, the album title as the next lower layer, and the track title as the lowest layer.

In this case, the CPU 110 first displays the track list which is information of the lowest layer on the track selection screen 210, for example. Now, let us say that the ending point of the mochi cursor Cs has entered the upper edge region 210A or lower edge region 210C from within the center region 210B by dragging in the vertical direction of the screen. The CPU 110 then transfers the display content to the album list which is information of a layer one higher than the track list.

Let us say that, subsequently, dragging is continued, and the length of the mochi cursor Cs has shrunk to the predetermined threshold or below. The CPU 110 then transfers the display content to the track list which is information of a layer one lower than the album list.

Conversely, let us say that, after switching to the album list, dragging is continued, and the ending point of the mochi cursor Cs enters the upper edge region 210A or lower edge region 210A again after temporarily returning to the center region 210B. The CPU 110 then transfers the display content from the album list to the artist list which is information of a layer one higher than the album list.

Let us say that the dragging is continued, and the length of the mochi cursor Cs has shrunk to the predetermined threshold or below. The CPU 110 then transfers the display content from the artist list to the album list which is information of a layer one lower than the artist list.

Also, in the case that dragging has ended, the CPU 110 transfers the display content to the track list which is information of the lowest layer, regardless of the current display content.

Also, not limited to this, with various applications, multiple layers of information can be sequentially switched, according to the ending point of the mochi cursor Cs entering a predetermined region set on the screen.

Also, with the first embodiment described above, with a moving picture playing application, the information of layers is switched from chapter to chapter list, but not limited to this, for example, the chapters may be switched, from a chapter to the next chapter.

That is to say, let us say that the ending point of the mochi cursor Cs has entered the right edge region 200C from the center region 200B by dragging in the horizontal direction of the screen. The CPU 110 then modifies the display content to display the next chapter after the currently displayed chapter.

On the other hand, let us say that the ending point of the mochi cursor Cs has entered the left edge region 200A from the center region 200B by dragging in the horizontal direction of the screen. The CPU 110 modifies the display content to be the chapter that is one prior to the currently displayed chapter.

Subsequently, upon the dragging being ended, the CPU 110 returns the playing of the chapter displayed at the time thereof to normal playing.

Also, not limited to this, with the applications the information to be displayed may be sequentially switched according to the ending point of the mochi cursor Cs entering a predetermined region set on the screen.

Note that the position and size of the region herein is not to be restricted, but if a moving picture playing application, the chapter playing speed is controlled by stretching the mochi cursor Cs in the horizontal direction, whereby it is desirable for the region to be an edge portion on the left and right, positioned on an extended line of the stretched mochi cursor Cs.

Also with a tune playing application, it is desirable for the region to be an upper or lower edge portion, since the list scrolling is controlled by stretching the mochi cursor Cs in the vertical direction.

4-4. Other Embodiment 4

Further, with the first embodiment described above, the upper edge portion of the luminance-chroma palette 221 displayed on the lower edge of the still image playing screen 220 is touched, and upon flicking in the upper direction of the screen being performed, the luminance-chroma palette 221 is pulled out onto the screen.

Not limited to this, a separate menu or the like may be displayed on the still image playing screen 220, and upon the luminance-chroma setting being selected from the menu, the luminance-chroma palette 221 may be displayed on the screen. Also, the luminance-chroma palette 221 may be displayed on the screen from the beginning.

Also, according to the embodiment described above, the luminance-chroma palette 221 is displayed at a position and size that takes up the lower half of the entire screen.

Not limited to this, the luminance-chroma palette 221 may be displayed at a position and size that takes up the lower half or upper half of the screen, or may be displayed at a position and size that takes up a central portion which includes a center line that divides the screen in two equal parts, above and below, for example.

Also at this time, if the dragging starting point is at a position not covered by the luminance-chroma palette 221, the still image displayed on the screen can be scrolled according to the dragging.

In this case, the CPU 110 controls the scrolling of the still image according to the direction and length of the dragging (or flicking) herein.

Thus, processing to be executed can be changed according to the dragging position such as, if the dragging starting point is within the luminance-chroma palette 221, adjustments are made to the luminance/chroma, and if on the still image outside of the luminance-chroma palette 221, the still image is scrolled.

Also, according to the first embodiment described above, the luminance-chroma palette 221 made up of a luminance setting region 221L for adjusting the luminance and a chroma setting region 221R for adjusting the chroma is displayed.

Not limited to this, a luminance palette (unshown) made up of a luminance increasing region to increase the luminance and a luminance decreasing region to decrease the luminance may be displayed, for example.

In this case, upon dragging being performed in the vertical direction with the luminance increasing region as a starting point, the CPU 110 displays a vertical-facing mochi cursor Cs, while increasing the luminance with adjustment speed values according to the length of the mochi cursor Cs.

Also, upon dragging being performed in the vertical direction with the luminance decreasing region as a starting point, the CPU 110 displays a vertical-facing mochi cursor Cs, while decreasing the luminance with adjustment speed values according to the length of the mochi cursor Cs.

Further, not limiting to luminance or chroma, regions corresponding to various parameters relating to image quality such as lightness, sharpness, and so forth may be provided, and parameters that are adjustable by dragging may be modified according to which region the first touch position is in.

4-5. Other Embodiment 5

Also, according to the first and second embodiments described above, the present disclosure is applicable to a portable terminal 100 having a touch screen 102 serving as an operating device.

Not limited to this, the present disclosure may be applicable to information processing devices having other various operating devices, and can be applicable thereto.

Specifically, the present disclosure is applicable to information processing devices having an operating device that can be dragged, such as a mouse, a touch pad with buttons, a joystick with buttons, an analog stick capable of pressing operations, a camera, and so forth.

In the case of performing dragging with a mouse, the CPU 110 displays a pointer that moved in accordance with the movement of a mouse on the screen, for example.

Subsequently, the user moves the pointer to a desired position, and clicks the button on the mouse, thereby specifying the dragging starting point. Now, the CPU 110 displays the mochi cursor Cs. The user then performs dragging by moving the mouse with the button clicked and moving the dragging ending point (i.e. the ending point of the mochi cursor Cs).

Also, in the case of performing dragging with a touch pad with buttons, the CPU 110 displays a pointer on the screen that moves according to a touch operation as to the touch pad, for example. Subsequently, the user moves the pointer to a desired position, and presses a button on the touch pad, thereby specifying the dragging starting point. Now, the CPU 110 displays the mochi cursor Cs. The user then performs dragging by moving the touch position with the button pressed and moving the dragging ending point (i.e. the ending point of the mochi cursor Cs).

Further, in the case of performing dragging with a joystick with buttons, the CPU 110 displays a pointer on the screen that moves according to the slope of the joystick, for example. Subsequently, the user moves the pointer to a desired position, and presses a button on the joystick, thereby specifying the dragging starting point. Now, the CPU 110 displays the mochi cursor Cs. The user then performs dragging by tilting the joystick with the button pressed and moving the dragging ending point (i.e. the ending point of the mochi cursor Cs.

Further, in the case of performing dragging with an analog stick, the CPU 110 displays a pointer on the screen that moves according to the slope of the analog stick, for example. Subsequently, the user moves the pointer to a desired position, and pushes in the analog stick, thereby specifying the dragging starting point. Now, the CPU 110 displays the mochi cursor Cs. The user then performs dragging by tilting the analog stick with the analog stick pushed in and moving the dragging ending point (i.e. the ending point of the mochi cursor Cs).

Further, in the case of performing dragging with a camera, the CPU 110 confirms the movement of a finger based on an image photographed with the camera, for example, and displays a pointer on the screen that moves according to the movement of the finger herein. Subsequently, the user moves the pointer to a desired position, and performs a predetermined gesture (e.g. a gesture of drawing a circle with the finger), thereby specifying the dragging starting point. Now, the CPU 110 displays the mochi cursor Cs. The user then performs dragging by further moving the finger and moving the dragging ending point (i.e. the ending point of the mochi cursor Cs).

Note that the operations described above are examples, and it is important only to have an operation that specifies the dragging starting point and ending point.

Also, if the information processing device having these operating devices other than a touch screen 102, an operation device and a display device may be provided separately, and also may be connected to an external display device.

4-6. Other Embodiment 6

Further, according to the first embodiment described above, a mochi cursor Cs is displayed according to the dragging.

Now, processing information showing what sort of processing is currently performed according to the operation inputs from the mochi cursor Cs may be displayed on the screen along with the mochi cursor Cs.

For example, when the moving picture is played at an optional playing speed according to the operation input by the mochi cursor Cs, the CPU 110 causes characters such as "fast-forward" and "rewind" and so forth indicating the playing direction at this time to be displayed on the screen. Also, characters directly showing the values of the playing direction and playing speed such as "2.0×" or "−1.5×", and implicit shapes such as ">>" or "<<<" may be displayed.

Thereby, the user can readily confirm what sort of processing is currently being performed, according to operation inputs by the mochi cursor Cs.

Also, if the value of the playing speed reaches a maximum value, the mochi cursor Cs can be arranged so as to not stretch any further. Also at this time, the mochi cursor Cs may be displayed to as to flash, or the information described above that shows the values of the playing direction and playing speed ("2.0×", ">>", etc.) may be displayed so as to flash.

That is to say, so that the user can understand that the value of the playing speed has reached the maximum value, the mochi cursor Cs and the display format of the information showing the value of the playing speed may be changed.

4-7. Other Embodiment 7

Further, according to the first embodiment described above, with a tune playing application, upon the CPU 110 transferring to the album list, when the length of the mochi cursor Cs is at a predetermined threshold or below, the content is returned from the album list to the track list.

Now, this operation may be applied to a moving picture playing application. That is to say, with a moving picture playing application, upon the CPU 110 transferring to the chapter list, when the length of the mochi cursor Cs is at a predetermined threshold or below, the content is returned from the chapter list to the chapter.

4-8. Other Embodiment 8

Further, according to the first embodiment described above, the values of the moving picture playing direction and playing speed are controlled according to the direction and length of the mochi cursor Cs.

Not limited to this, the playing direction may be fixed, and just the value of the moving picture playing speed may be controlled according to the length only, regardless of the direction, of the mochi cursor Cs.

Also, the value of the playing speed of the moving picture may be fixed, and just the value of the moving picture playing speed may be controlled according to the direction only, regardless of the length, of the mochi cursor Cs.

Further, the scrolling direction of the track list may be fixed, and just the value of the scrolling speed of the track list may be controlled according to the length only, regardless of the direction, of the mochi cursor Cs.

Further, the value of the scrolling speed of the track list may be fixed, and just the scrolling direction of the track list may be controlled according to the direction only, regardless of the length, of the mochi cursor Cs.

Further, the value of the volume adjustment speed may be fixed, and just the volume adjustment direction may be controlled according to the direction only, regardless of the length of the mochi cursor Cs.

Also, not limiting to content playing, switching of display content, list scrolling, and parameter adjustments, various other processes can be executed with the operation input by the mochi cursor Cs.

4-9. Other Embodiment 9

Further, according to the first and second embodiments described above, a touch screen 102 made up of a liquid crystal panel 102A and a capacitance-type touch panel 102B is provided on the portable terminal 100.

Not limited to this, a liquid crystal display having a built-in touch panel function may be provided, instead of the touch screen 102, to the portable terminal 100.

Further, regarding the liquid crystal panel 102A also, an EL (Electroluminescence display) display or the like, or other various types of displays may be used.

4-10. Other Embodiment 10

Further, according to the first and second embodiments described above, the shape of the mochi cursor Cs has a shape that grows wider, facing the ending point C2 side from the starting point C1 side.

Not limited to this, as long as the shape at least links the dragging starting point and ending point, the shape of the mochi cursor Cs may be various shapes other than this. Also, the size of the mochi cursor Cs may be various sizes.

4-11. Other Embodiment 11

Further, according to the first embodiment described above, for the dragging to increase/decrease the zooming scale of the still image, whether to increase/decrease the zooming scale by an amount equivalent to the amount of dragging, or whether to set the increase/decrease speed of the zooming scale by an amount equivalent to the amount of dragging and continuing to increase/decrease the zooming scale, can be switched.

Not limited to this, for dragging to increase/decrease various other parameters, whether to increase/decrease the parameter by an amount equivalent to the amount of dragging, or whether to set the increase/decrease speed of the parameter according to the dragging and continuing to increase/decrease the parameter, may be switched.

Also, not limited to this, for dragging to change values relating to various other processes, whether to change the values by an amount equivalent to the amount of dragging, or whether to set the change speed of the values and continue to change the values, may be switched.

For example, for dragging to move the playing position of the content (moving picture, tune, etc.), whether to move the playing position by the amount of dragging, or whether to set the moving speed of the playing position according to the dragging and continuing to move the playing position, may be switched.

In this case, with a moving picture playing application, let us say that a moving picture is displayed on the touch screen 102 in the state of being temporarily stopped. Upon dragging in the horizontal direction of the screen being performed, the CPU 110 displays a mochi cursor Cs according to the dragging. Along with this, the CPU 110 sets a center region (unshown) made up of the dragging starting point as the center in the horizontal direction and a predetermined length in the horizontal direction, and determines whether or not there is an ending point of the mochi cursor Cs (dragging ending point) within the center region.

At this time, if the ending point of the mochi cursor Cs is within the center region, the CPU 110 moves the playing position of the moving picture by an amount equivalent to the amount of dragging.

Specifically, if the dragging direction is the right-facing direction of the screen, the CPU 110 moves the playing position in the forward direction according to changes to the position of the dragging ending point in the horizontal direction (i.e. frame-by-frame playback according to the dragging). On the other hand, if the dragging direction is the left-facing direction of the screen, the CPU 110 moves the playing position in the reverse direction according to changes to the position of the dragging ending point in the horizontal direction (i.e. frame-by-frame rewind according to the dragging). Note that at this time the CPU 110 increases the movement amount of the playing position as the length of the dragging increases.

Also, if the ending point of the mochi cursor Cs is outside the center region, the CPU 110 sets the movement speed of the moving picture playing position (i.e. playing speed) according to the direction and length of the mochi cursor Cs, and continues to move the playing position at the moving speed herein.

Specifically, if the direction of the mochi cursor Cs is right-facing, the CPU 110 sets the sign of the playing speed to +, and the playing direction to the forward direction. On the other hand, if the direction of the displayed mochi cursor Cs is left-facing, the CPU 110 sets the sign of the playing speed to −, and the playing direction to the reverse direction. Further, the CPU 110 sets the value of the playing speed to a greater value as the length of the mochi cursor Cs lengthens.

Thus, depending on whether the dragging ending point is within the center region or not, the CPU 110 switches between whether to move the playing position by an amount equivalent to the amount of dragging or whether to set the movement speed of the playing position (playing speed) and according to the dragging continues to move the playing position.

Also for example, the CPU 110 can switch, for dragging that moves the display position of various display items (images, text, lists, etc.), between whether to move the display position by an amount equivalent to the amount of dragging, or whether to set the movement speed of the display position according to the dragging and continuing to move the display position.

In this case, for example, let us say that with a tune playing application, a track list is displayed on the touch screen 102 wherein tune titles are arrayed in a vertical column.

Upon dragging being performed in the vertical direction of the screen, the CPU 110 displays a mochi cursor Cs according to the dragging herein. Along with this, the CPU 10 sets a center region (unshown) made up of the dragging starting point as the center in the vertical direction and a predetermined length in the vertical direction, and determines whether or not there is an ending point of the mochi cursor Cs (dragging ending point) within the center region.

At this time, if the ending point of the mochi cursor Cs is within the center region, the CPU 110 moves the display position of the title in the track list by an amount equivalent to the amount of dragging (i.e., scrolls through the track list).

Specifically, if the dragging direction is the upward-facing direction of the screen, the CPU 110 sets the title moving direction to the downward direction (the scrolling direction is the upward direction), and moves the title display position according to the changes in position of the dragging ending point in the vertical direction (scrolls through the track list). On the other hand, if the dragging direction is the downward-facing direction of the screen, the CPU 110 sets the title moving direction to the downward direction (the scrolling direction is the downward direction), and moves the title display position according to the changes in position of the dragging ending point in the vertical direction (scrolls through the track list). That is to say, the CPU 110 performs general scrolling control according to dragging.

Also, if the ending point of the mochi cursor Cs is outside the center region, the CPU 110 sets the movement speed of the title displaying position (i.e. scrolling speed) according to the direction and length of the mochi cursor Cs, and continues to move the display position of the title (scrolls) at the moving speed herein.

Specifically, if the direction of the mochi cursor Cs is upward-facing, the CPU 110 sets the sign of the track list scrolling speed to +, and the scrolling direction to the upward direction (i.e. the title is in the direction of moving downward). On the other hand, if the direction of the mochi cursor Cs is downward-facing, the CPU 110 sets the sign of the track list scrolling speed to −, and the scrolling direction to the downward direction (i.e. the title is in the direction of moving upward). Further, the CPU 110 sets the value of the scrolling speed to a greater value as the length of the mochi cursor Cs lengthens.

Thus, depending on whether the dragging ending point is within the center region or not, the CPU 110 switches between whether to move the display position by an amount equivalent to the amount of dragging or whether to set the movement speed of the display position (scrolling speed) and continues to move the display position.

4-12. Other Embodiment 12

Further, according to the first embodiment described above, the method for increasing/decreasing the zooming scale of the still image according to dragging is switched depending on whether or not the dragging ending point is within the region wherein the dragging starting point is set as the center in the vertical direction (center region 220B)

Not limited to this, if within a predetermined range from the dragging starting point, various ranges can be set, and the method for increasing/decreasing the zooming scale of the still image according to dragging may be switched depending on whether or not the dragging ending point is within the regions.

When the dragging ending point is within a circular range that is a predetermined distance from the dragging starting point, the CPU 110 may increase/decrease the zooming scale in the dragged amount, for example. When the dragging ending point is within a circular range that is a predetermined distance from the dragging starting point, the CPU 110 may increase/decrease the zooming scale by an amount equivalent to the amount of dragging or may set the increase/decrease speed of the zooming scale according to the dragging and continue to increase/decrease the zooming scale.

Also, not limited to this, switching may be performed to other methods of increasing/decreasing the still image zooming scale according to the dragging, according to the position of the ending point as to the dragging starting point.

For example, the method of increasing/decreasing the still image zooming scale according to the dragging may be switched according to whether the dragging starting point-ending point direction is in the vertical direction of the screen or the horizontal direction of the screen.

In this case, for example, when the dragging starting point-ending point direction is in the vertical direction of the screen (i.e. the upper direction of the screen or the lower direction of the screen), the CPU 110 sets the increase/decrease speed of the zooming scale according to the dragging and continues to increase/decrease the zooming scale with the increased/decreased speed. On the other hand, when the dragging starting point-ending point direction is in the horizontal direction of the screen (i.e. the right direction of the screen or the left direction of the screen), the CPU 110 increases/decreases the zooming scale by an amount equivalent to the amount of dragging.

4-13. Other Embodiment 13

Further, according to the first embodiment, when an optional position on the still image is long-pressed, the center region 220B having the long-pressed position as the center in the vertical direction is set, while a zoom indicator Zi indicating the range of the center region 220B is displayed.

Not limited to this, an arrangement may be made wherein the zoom indicator Zi indicating the range of the center region 220B is not displayed.

4-14. Other Embodiment 14

Further, according to the second embodiment described above, with the map display application, if the dragging ending point moves outside of the center region 230A, the mode is transferred to mochi scrolling mode, and the scrolling speed of the map image is controlled with the operation inputs from the mochi cursor Cs.

Not limited to this, with the map display application, the mode may be continually set to mochi scrolling mode when dragging is performed, regardless of the position of the dragging ending point, and the map image scrolling speed may be controlled with the operation inputs from the mochi cursor Cs.

Figure 29:
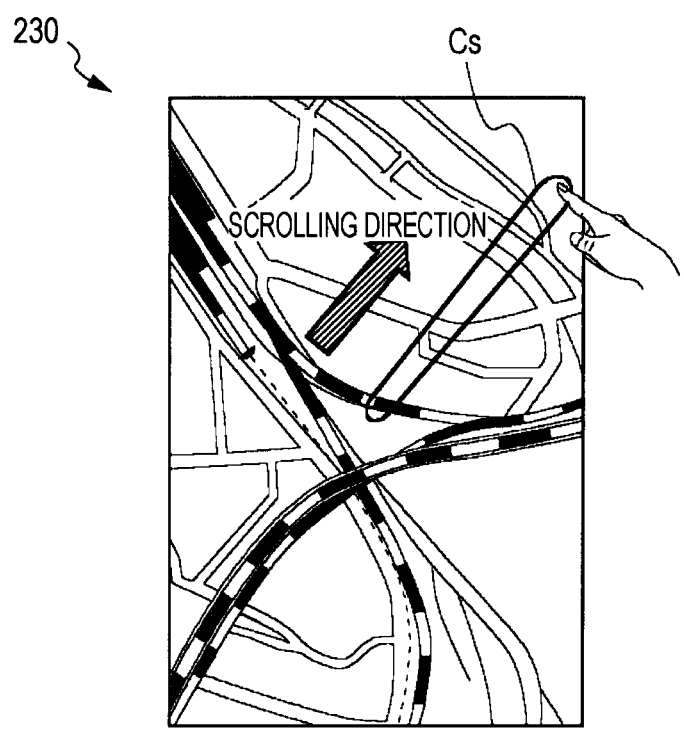
FIG. 29 is a schematic diagram to accompany a description of a first operation input example by a mochi cursor with a map display application according to another embodiment.

In this case, upon dragging being performed, the CPU 110 displays the mochi cursor Cs according to the dragging, as shown in FIG. 29. The CPU 110 then sets the same direction as the direction of the displayed mochi cursor Cs as the map image scrolling direction, and sets the value of the scrolling speed to a greater value as the length of the mochi cursor Cs is lengthened.

Also, not limited to this, with the map display application, the normal scrolling mode and mochi scrolling mode may be switched according to whether or not the dragging starting point is within the predetermined region on the screen.

Figure 30C:
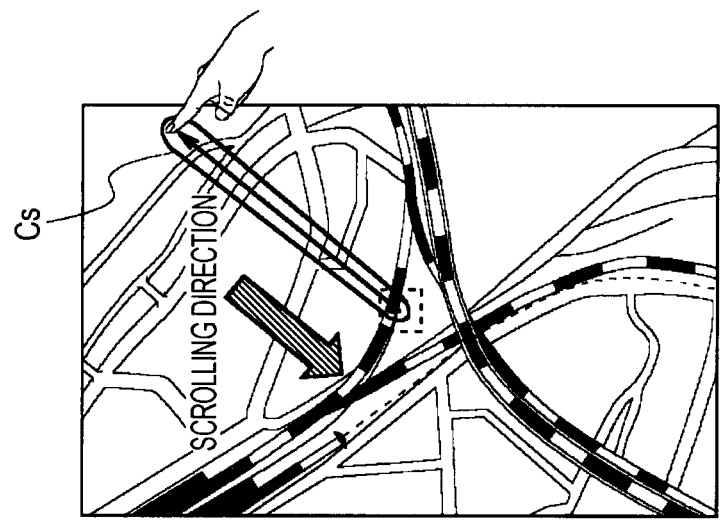
FIGS. 30A through 30C are schematic diagrams to accompany a description of a second operation input example by a mochi cursor with a map display application according to another embodiment.
Figure 30B:
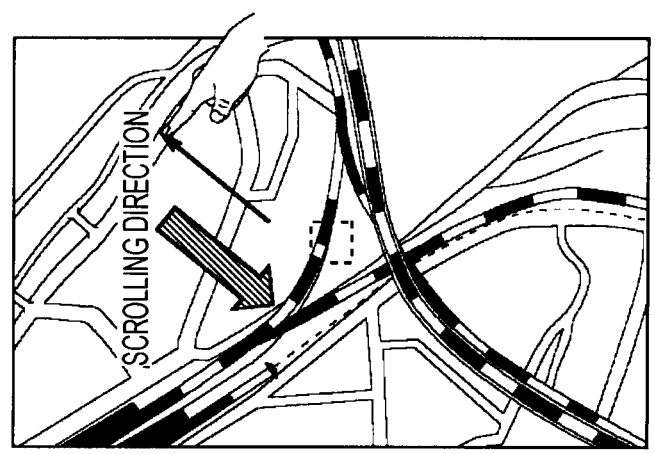
Figure 30A:
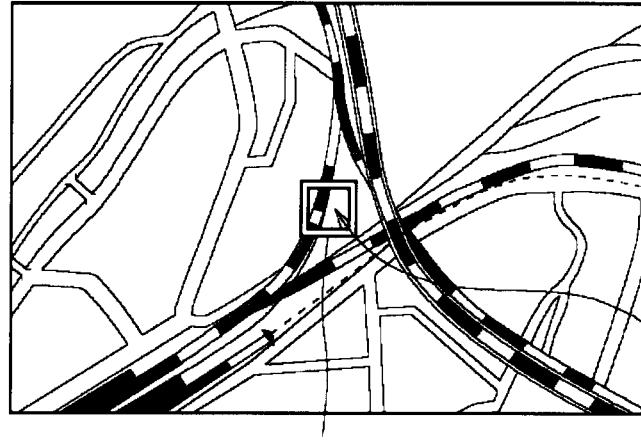

In this case, as shown in FIG. 30A, a center region 230C made up of a rectangular region of a size that slightly extends past a finger is set in the center of the screen on the map screen 230, for example. Upon starting the map display application, the CPU 110 displays the map image on the map screen 230, while displaying a frame Fr2 indicating the center region 230C.

Upon dragging being performed, the CPU 110 determines whether or not the dragging starting point is within the center region 230C of the screen.

Now, as shown in FIG. 30B, if the dragging starting point is outside the center region 230C, the CPU 110 sets the scrolling mode to the normal scrolling mode, and deletes the frame Fr2 from the screen.

The CPU 110 then controls the scrolling of the map image according to the direction and length of the dragging herein. Specifically, the CPU 110 scrolls the map image in a direction opposite from the direction of dragging, in an amount according to the length of dragging.

On the other hand, as shown in FIG. 30C, if the dragging starting point is within the center region 230C, the CPU 110 sets the scrolling mode to the mochi scrolling mode. At this time the CPU 110 deletes the frame Fr2 from the screen, while displaying on the screen the mochi cursor Cs that stretches from the dragging starting point to the ending point.

Upon displaying the mochi cursor Cs, the CPU 110 controls the map image scrolling according to the direction and length of the mochi cursor Cs.

Specifically, the CPU 110 sets the direction opposite from the direction of the displayed mochi cursor Cs as the scrolling direction of the map image. Further, the value of the scrolling speed is set to a greater value as the length of the mochi cursor Cs is lengthened.

Upon the dragging ending, the CPU 110 ends the map image scrolling, and in the case that the mochi cursor Cs has been displayed deletes the mochi cursor Cs from the screen, and displays the frame Fr2 again.

Thus, when the dragging starting point is outside the center region 230C, the CPU 110 performs general scrolling control by dragging, and when the dragging starting point is within the center region 230C, performs control of the scrolling speed with the mochi cursor Cs.

Thus, by enabling the user to perform the simple operation of changing the dragging starting point, the portable terminal 100 can enable the user to readily select general scrolling control by dragging or scrolling speed control with the mochi cursor Cs.

4-15. Other Embodiment 15

Further, according to the first embodiment described above, with the tune playing application, the scrolling direction of the track list is in the opposite direction from the direction of the mochi cursor Cs.

Not limited to this, with the tune playing application, the scrolling direction of the track list may be set as the same direction as the direction of the mochi cursor Cs.

Also, not limited to this, with other applications, the scrolling direction may be in the same direction as the mochi cursor Cs, or the scrolling direction may be in the direction opposite from the direction of the mochi cursor Cs. It is important to set whether to have the scrolling direction as the same direction of the mochi cursor Cs or the opposite direction thereto, for each application as appropriate.

4-16. Other Embodiment 16

Further, according to the first and second embodiments described above, a touch screen 102 serving as an operating unit and display unit, and a CPU 110 serving as a control unit are provided to the portable terminal 100 serving as an information processing device.

The present disclosure is not limited to these, and the functional units of the portable terminal 100 described above (operating unit, control unit, display unit may be configured with other various types of hardware, as long as these have similar functions.

4-17. Other Embodiment 17

Further, according to the first and second embodiments described above, a program for executing various processes is written into a nonvolatile memory 111 of the portable terminal 100.

Not limited to this, for example a slot for storage medium such as a memory card may be provided to the portable terminal 100, wherein the CPU 110 reads out and executes the program from the storage medium inserted into the slot. Also, the CPU 110 may install the program read out from the storage medium on the nonvolatile memory 111. Further, the CPU 110 may download the program from a device on a network, via a network interface 113, and install this on the nonvolatile memory 111.

4-18. Other Embodiment 18

Further, the present disclosure is not to be limited to the above-described first and second embodiments and other embodiments. That is to say, the applicable scope of the present disclosure extends to an embodiment of a combination of a portion or all of the first and second embodiments and other embodiments, or an embodiment of a portion extracted therefrom.

The present disclosure contains subject matter related to that disclosed in Japanese Priority Patent Application JP 2010-172894 filed in the Japan Patent Office on Jul. 30, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method of operating a device, the method comprising:
   displaying, in response to determining that a first position on a screen of the device has been continuously touched by a user for more than a threshold period of time,
      a cursor at the first position on the screen, and
      at least one visual indicator at a second position on the screen,
      the at least one visual indicator including a first portion and a second portion visually distinguished from the first portion,
         the first portion identifying a first operation that will be executed by the device in response to an operation of dragging the cursor in a first direction relative to the first position, and
         the second portion identifying a second operation that will be executed by the device in response to an operation of dragging the cursor in a second direction relative to the first position;
   performing the first operation in response to a user dragging the cursor from the first position in the first direction; and
   performing the second operation in response to a user dragging the cursor from the first position in the second direction,
   the first operation being different than the second operation,
   the first direction being different than the second direction,
   while the user drags the cursor from the first position in the first direction or the second direction, the first and second portions of the at least one visual indicator remaining stationary on the screen, and
   a shape of the cursor being changed in response to the user dragging the cursor from the first position in the first direction or the second direction.

2. The method of claim 1, wherein the displaying includes displaying the cursor at the first position such that the cursor has a circular shape before a user drags the cursor away from the first position.

3. The method of claim 2, further comprising:
   displaying the cursor, in response to a user dragging the cursor from the first position on the screen to a third position on the screen, such that the cursor has a first shape that extends from the first position to the third position,
   the first position being different from the third position.

4. The method of claim 3, wherein the first shape includes a first semicircular portion adjacent to the first position and a second semicircular portion adjacent to the third position.

5. The method of claim 4, wherein the first semicircular portion of the first shape has a first radius and the second semicircular portion of the first shape has a second radius that is different than the first radius.

6. The method of claim 4, wherein the first semicircular portion of the first shape has a first radius and the second semicircular portion of the first shape has a second radius that is larger than the first radius.

7. A device comprising:
   a screen;
   memory storing computer-executable instructions; and
   one or more processors configured to execute the computer-executable instructions such that the one or more processors are configured to,
      display, in response to determining that a first position on the screen has been continuously touched by a user for more than a threshold period of time,
         a cursor at the first position on the screen, and
         at least one visual indicator at a second position on the screen,
         the at least one visual indicator including a first portion and a second portion visually distinguished from the first portion,
            the first portion identifying a first operation that will be executed by the one or more processors in response to an operation of dragging the cursor in a first direction relative to the first position, and
            the second portion identifying a second operation that will be executed by the one or more processors in response to an operation of dragging the cursor in a second direction relative to the first position,
      perform the first operation in response to a user dragging the cursor from the first position in the first direction, and perform the second operation in response to a user dragging the cursor from the first position in the second direction, the first operation being different than the second operation, the first direction being different than the second direction, while the user drags the cursor from the first position in the first direction or the second direction, the first and second portions of the at least one visual indicator remaining stationary on the screen, and a shape of the cursor being changed in response to the user dragging the cursor from the first position in the first direction or the second direction.

8. The device of claim 7, wherein the one or more processors configured to execute the computer-executable instructions such that the displaying includes displaying the cursor at the first position such that the cursor has a circular shape before a user drags the cursor away from the first position.

9. The device of claim 8, wherein the one or more processors configured to execute the computer-executable instructions such that the one or more processors are further configured to display the cursor, in response to a user dragging the cursor from the first position on the screen to a third position on the screen, such that the cursor has a first shape that extends from the first position to the third position, the first position being different from the third position.

10. The device of claim 9, wherein the one or more processors configured to execute the computer-executable instructions such that the first shape includes a first semicircular portion adjacent to the first position and a second semicircular portion adjacent to the third position.

11. The device of claim 10, wherein the one or more processors configured to execute the computer-executable instructions such that the first semicircular portion of the first shape has a first radius and the second semicircular portion of the first shape has a second radius that is different than the first radius.

12. The device of claim 10, wherein the one or more processors configured to execute the computer-executable instructions such that the first semicircular portion of the first shape has a first radius and the second semicircular portion of the first shape has a second radius that is larger than the first radius.

13. A non-transitory computer readable medium storing computer-executable instructions that, when executed by one or more processors, cause the one or more processors to perform operations for operating a device, the operations comprising:

displaying, in response to determining that a first position of a screen of the device has been continuously touched by a user for more than a threshold period of time,
a cursor at the first position on the screen, and
at least one visual indicator at a second position on the screen, the at least one visual indicator including a first portion and a second portion visually distinguished from the first portion, the first portion identifying a first operation that will be executed by the device in response to an operation of dragging the cursor in a first direction relative to the first position, and the second portion identifying a second operation that will be executed by the device in response to an operation of dragging the cursor in a second direction relative to the first position;

performing the first operation in response to a user dragging the cursor from the first position in the first direction; and performing the second operation in response to a user dragging the cursor from the first position in the second direction, the first operation being different than the second operation, the first direction being different than the second direction, while the user drags the cursor from the first position in the first direction or the second direction, the first and second portions of the at least one visual indicator remaining stationary on the screen, and a shape of the cursor being changed in response to the user dragging the cursor from the first position in the first direction or the second direction.

14. The non-transitory computer readable medium of claim 13, wherein the displaying includes displaying the cursor at the first position such that the cursor has a circular shape before a user drags the cursor away from the first position.

15. The non-transitory computer readable medium of claim 14, further comprising:

displaying the cursor, in response to a user dragging the cursor from the first position on the screen to a third position on the screen, such that the cursor has a first shape that extends from the first position to the third position, the first position being different from the third position.

16. The non-transitory computer readable medium of claim 15, wherein the first shape includes a first semicircular portion adjacent to the first position and a second semicircular portion adjacent to the third position.

17. The non-transitory computer readable medium of claim 16, wherein the first semicircular portion of the first shape has a first radius and the second semicircular portion of the first shape has a second radius that is different than the first radius.

18. The non-transitory computer readable medium of claim 16, wherein the first semicircular portion of the first shape has a first radius and the second semicircular portion of the first shape has a second radius that is larger than the first radius.

* * * * *